United States Patent
Oono et al.

(10) Patent No.: US 11,945,446 B2
(45) Date of Patent: Apr. 2, 2024

(54) CONTROL DEVICE

(71) Applicant: Hitachi Astemo, Ltd., Hitachinaka (JP)

(72) Inventors: Shigemi Oono, Hitachinaka (JP); Sadato Horiuchi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 422 days.

(21) Appl. No.: 17/293,771

(22) PCT Filed: Nov. 27, 2019

(86) PCT No.: PCT/JP2019/046274
§ 371 (c)(1),
(2) Date: May 13, 2021

(87) PCT Pub. No.: WO2020/121807
PCT Pub. Date: Jun. 18, 2020

(65) Prior Publication Data
US 2022/0024456 A1 Jan. 27, 2022

(30) Foreign Application Priority Data
Dec. 14, 2018 (JP) .................................. 2018-234660

(51) Int. Cl.
*B60W 30/188* (2012.01)
*B60W 40/105* (2012.01)
(Continued)

(52) U.S. Cl.
CPC ........ *B60W 30/188* (2013.01); *B60W 40/105* (2013.01); *B60W 50/0205* (2013.01);
(Continued)

(58) Field of Classification Search
CPC ............. B60W 30/188; B60W 40/105; B60W 50/0205; B60W 50/0209;
(Continued)

(56) References Cited

U.S. PATENT DOCUMENTS 6,185,996 B1 * 2/2001 He ...................... G01M 15/044
701/102
2010/0036558 A1 2/2010 Murakami
(Continued)

FOREIGN PATENT DOCUMENTS

JP 6-307274 A 11/1994
JP 11-44246 A 2/1999
(Continued)

OTHER PUBLICATIONS

Japanese-language Office Action issued in Japanese Application No. 2020-559092 dated Jun. 7, 2022 with English translation (nine (9) pages).
(Continued)

*Primary Examiner* — Lori Wu
(74) *Attorney, Agent, or Firm* — Crowell & Moring LLP

(57) ABSTRACT

An in-vehicle control device includes: a requested torque calculation unit which calculates a requested torque on the basis of a driving state of a vehicle; a requested torque change amount calculation unit which calculates the amount of change in requested torque per unit time as a requested torque change amount; an estimated generation torque calculation unit which calculates estimated generation torque estimated as being generated by an engine; an estimated generation torque change amount calculation unit which calculates the amount of change in estimated generation torque per unit time as an estimated generation torque change amount; and an abnormality detection unit which detects an abnormality of the engine on the basis of the integrated value of a difference between the requested torque change amount and the estimated generation torque change amount, and outputs abnormality determination for the engine.

9 Claims, 21 Drawing Sheets

(51) Int. Cl.
*B60W 50/02* (2012.01)
*B60W 50/029* (2012.01)
*F02D 11/10* (2006.01)
*F02D 41/22* (2006.01)
*B60W 50/00* (2006.01)

(52) U.S. Cl.
CPC ......... *B60W 50/029* (2013.01); *F02D 11/105* (2013.01); *F02D 41/22* (2013.01); *B60W 2050/0054* (2013.01); *B60W 2510/0609* (2013.01); *B60W 2510/0661* (2013.01)

(58) Field of Classification Search
CPC . B60W 2050/0054; B60W 2050/0292; B60W 2510/0609; B60W 2510/0611; F02D 2250/18; F02D 11/107; F02D 41/0002; F02D 41/1497; F02D 41/22; F02D 41/0097; F02D 11/105; F02D 2200/0404; F02D 2200/1004
See application file for complete search history.

(56) References Cited

U.S. PATENT DOCUMENTS

| | | | |
|---|---|---|---|
| 2015/0240728 A1* | 8/2015 | Funakoshi | F02D 29/02 701/70 |
| 2017/0002763 A1* | 1/2017 | Oono | F02D 11/107 |
| 2020/0165996 A1* | 5/2020 | Goto | F02D 41/22 |

FOREIGN PATENT DOCUMENTS

| | | | |
|---|---|---|---|
| JP | H1144246 A | * | 2/1999 |
| JP | 2000-73835 A | | 3/2000 |
| JP | 2000073835 A | * | 3/2000 |
| JP | 4924905 B2 | | 4/2012 |

OTHER PUBLICATIONS

International Search Report (PCT/ISA/210) issued in PCT Application No. PCT/JP2019/046274 dated Mar. 17, 2020 with English translation (five (5) pages).
Japanese-language Written Opinion (PCT/ISA/237) issued in PCT Application No. PCT/JP2019/046274 dated Mar. 17, 2020 (four (4) pages).

* cited by examiner

RELATIONSHIP BETWEEN INTEGRATED VALUE OF
DIFFERENCE BETWEEN PIECES OF Δ TORQUE
AND ACCELERATION G ACCORDING TO DIFFERENCE
IN ENGINE ROTATION SPEED Ne

CONTROL DEVICE

TECHNICAL FIELD

The present invention relates to a control device which is mounted on, for example, a vehicle, and controls a propulsive force generated by a drive source of the vehicle.

BACKGROUND ART

In a control device according to the related art, driver-requested torque calculated on the basis of the amount of driving operation performed by the driver, for example, a detected value of an accelerator opening degree, and estimated generation torque calculated on the basis of the operation state of a drive source (for example, an internal combustion engine), for example, a detected value of the amount of air introduced into the internal combustion engine are compared with each other. Further, the control device determines that the drive source is abnormal when the estimated generation torque is excessive relative to the requested torque.

For example, PTL 1 describes that "actual torque is compared with requested torque to determine whether or not there is a torque increase abnormality in which the actual torque becomes excessive relative to the requested torque."

CITATION LIST

Patent Literature

PTL 1: JP 4924905 B2

SUMMARY OF INVENTION

Technical Problem

However, a sensor used to detect the amount of driving operation (for example, the accelerator opening degree) and a sensor used to detect the operation state of the drive source (for example, the amount of air introduced into the internal combustion engine) vary in performance or change in performance due to deterioration over time. Further, in a case where the drive source is, for example, an internal combustion engine, the drive source varies in friction due to the weight of each component, an assembly error, and the like. As described above, the sensor that detects the operation state of the drive source varies in performance, and the drive source also varies in configuration. In the control device according to the related art, the estimated generation torque is compared with a threshold value, and it is determined that the estimated generation torque is excessive when the estimated generation torque becomes larger than the threshold value. Therefore, it has been necessary to set a margin for the threshold value to be compared with the estimated generation torque.

However, in a case where an excessively large margin is set for the threshold value, the control device cannot determine the abnormality of the drive source or it takes a time to determine the abnormality. Therefore, there is a possibility that the control device cannot completely control the operation of the vehicle, and thus it is not possible to perform sufficient danger avoidance. Here, the danger avoidance is a control performed to suppress a torque abnormality of the drive source. The danger avoidance includes not only operations such as an operation in which the driver steps on a brake when recognizing a dangerous situation, but also controls such as a control in which the control device suppresses the output of the drive source without making the driver feel dangerous.

Further, as disclosed in PTL 1, it is difficult to set the threshold value by simply comparing the magnitude of the driver-requested torque calculated from the detected value of each sensor and the magnitude of the estimated generation torque of the drive source. Further, as described above, due to variations in sensor performance and the like, it has not been possible to perform abnormality determination that enables the driver to appropriately avoid danger. For example, in a case where the accuracy in calculation of the estimated generation torque is poor, there is a high possibility that it is determined that there is an abnormality even in a normal state where the acceleration unintended by the driver does not occur.

The present invention has been made in view of such a situation, and an object of the present invention is to enable abnormality determination by which a driver can appropriately avoid danger.

Solution to Problem

A control device according to the present invention includes: a requested torque calculation unit which calculates a requested torque on the basis of a driving state of a vehicle; a requested torque change amount calculation unit which calculates the amount of change in requested torque per unit time as a requested torque change amount; an estimated generation torque calculation unit which calculates an estimated generation torque estimated as being generated by a drive source of the vehicle; an estimated generation torque change amount calculation unit which calculates the amount of change in estimated generation torque per unit time as an estimated generation torque change amount; and an abnormality detection unit which detects an abnormality of the drive source on the basis of an integrated value of a difference between the requested torque change amount and the estimated generation torque change amount, and outputs abnormality determination for the drive source.

Further, a control device according to the present invention includes: a requested horsepower calculation unit which calculates a requested horsepower on the basis of a driving state of a vehicle; a requested horsepower change amount calculation unit which calculates the amount of change in requested horsepower per unit time as a requested horsepower change amount; an estimated generation horsepower calculation unit which calculates an estimated generation horsepower estimated as being generated by a drive source of the vehicle; an estimated generation horsepower change amount calculation unit which calculates the amount of change in estimated generation horsepower per unit time as an estimated generation horsepower change amount; and an abnormality detection unit which detects an abnormality of the drive source on the basis of an integrated value of a difference between the requested horsepower change amount and the estimated generation horsepower change amount, and outputs abnormality determination for the drive source.

Advantageous Effects of Invention

According to the present invention, when the abnormality of the drive source is detected in a state where the influence of variation in driving operation amount and operation state of the vehicle is suppressed, the abnormality determination is output, and the drive source is controlled. Therefore, it is possible to allow the driver to appropriately avoid danger.

Problems, configurations, and effects other than those described above will become apparent by the following description of embodiments.

DESCRIPTION OF EMBODIMENTS

Hereinafter, embodiments for carrying out the present invention will be described with reference to the accompanying drawings. In the present specification and the drawings, components having substantially the same function or configuration are designated by the same reference sign, and an overlapping description will be omitted.

First, an example of an internal configuration of an in-vehicle control device mounted on a vehicle will be described.

Figure 1A:
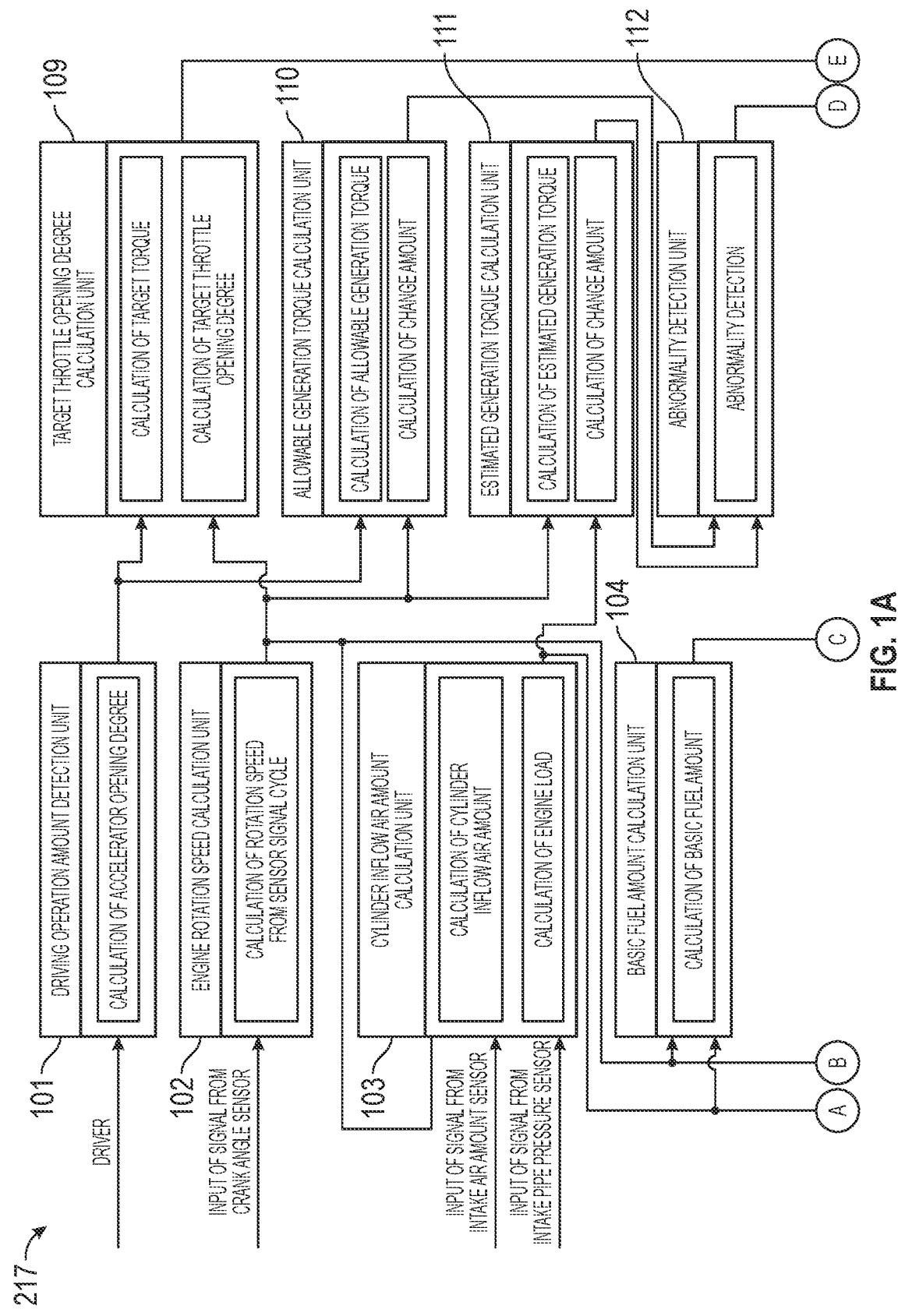
FIG. 1 is a control block diagram illustrating an example of an internal configuration of an in-vehicle control device according to a first embodiment of the present invention.
Figure 1B:
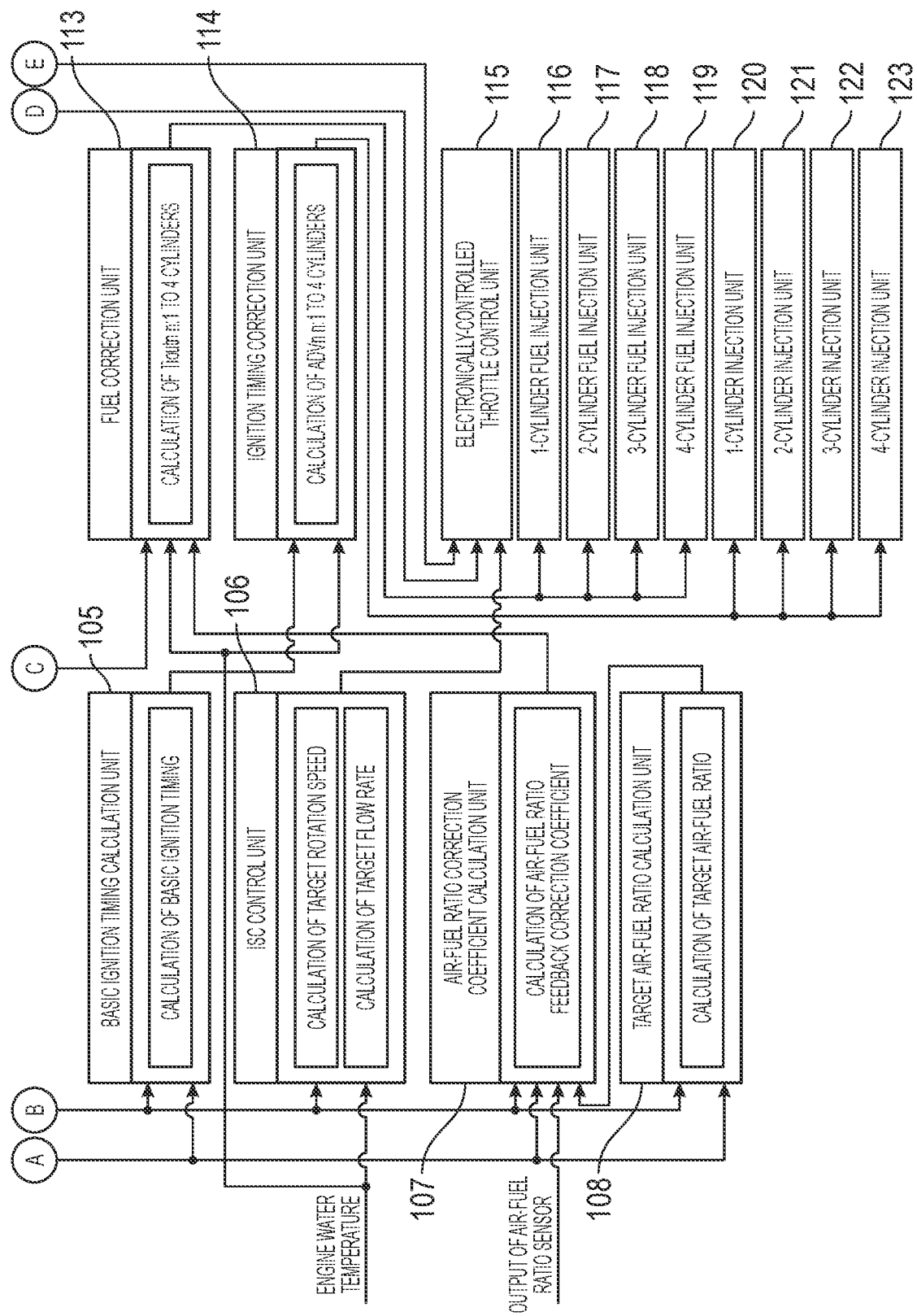

FIG. 1 is a control block diagram illustrating an example of the internal configuration of an in-vehicle control device 217. The outline of processing performed inside each control block included in the in-vehicle control device 217 will be described with reference to FIG. 1. The in-vehicle control device 217 is an example of a control device which is mounted on a vehicle and is capable of controlling the propulsive force of a drive source of the vehicle. In particular, the in-vehicle control device 217 according to the present embodiment has a function of monitoring whether or not the propulsive force generated from the drive source exceeds the propulsive force intended by a driver of the vehicle.

The in-vehicle control device 217 includes blocks 101 to 115 illustrated in FIG. 1. The in-vehicle control device 217 is used as an example of a control device that controls the operation of the drive source (an engine 201: an example of an internal combustion engine). Hereinafter, the respective blocks 101 to 115 will be described in order. Note that a 1-cylinder fuel injection unit 116 to a 4-cylinder fuel injection unit 119, and a 1-cylinder ignition unit 120 to a 4-cylinder ignition unit 123, which will be described later, are attached to the engine 201 (see FIG. 2).

A driving operation amount detection unit 101 detects a driving operation amount by calculating an accelerator opening degree of the driver.

An engine rotation speed calculation unit 102 counts the number of electric signals input from a crank angle sensor 219 (see FIG. 2) provided at a predetermined crank angle position of the engine 201 per unit time, mainly the number of pulse signal changes per unit time, and performs computation processing to calculate the rotation speed of the engine 201 per unit time.

A cylinder inflow air amount calculation unit 103 calculates the amount of air flowing into a cylinder of the engine 201 (cylinder inflow air amount). The cylinder inflow air amount is calculated on the basis of an intake air amount sensor signal indicating an intake air amount detected by an intake air amount sensor 202 (see FIG. 2) provided upstream of an intake system of the engine 201 and an intake pipe pressure sensor signal indicating an intake pipe pressure detected by an intake pipe pressure sensor 206 provided in an intake pipe 205 (see FIG. 2). Further, the cylinder inflow air amount calculation unit 103 calculates the load of the engine 201 on the basis of the calculated cylinder inflow air amount and the engine rotation speed calculated by the engine rotation speed calculation unit 102.

A basic fuel amount calculation unit 104 calculates a basic fuel amount required by the engine 201 in each region on the basis of the engine rotation speed calculated by the engine rotation speed calculation unit 102 and the engine load calculated by the cylinder inflow air amount calculation unit 103.

A basic ignition timing calculation unit 105 calculates an optimum basic ignition timing in each region of the engine 201 on the basis of the engine rotation speed calculated by the engine rotation speed calculation unit 102 and the engine load calculated by the cylinder inflow air amount calculation unit 103.

An idol speed control (ISC) control unit 106 calculates a target rotation speed during idling and calculates a target flow rate in order to keep the idling rotation speed of the engine 201 constant.

An air-fuel ratio correction coefficient calculation unit 107 calculates an air-fuel ratio feedback correction coefficient on the basis of an output of an air-fuel ratio sensor 211 (FIG. 2 to be described later) provided in an exhaust pipe of the engine 201, a difference in target air-fuel ratio to be described later, and the above-described engine rotation speed and engine load.

A target air-fuel ratio calculation unit 108 determines the target air-fuel ratio of the engine 201 on the basis of the engine rotation speed calculated by the engine rotation speed calculation unit 102 and the engine load calculated by the cylinder inflow air amount calculation unit 103.

A target throttle opening degree calculation unit 109 calculates target torque requested by the driver on the basis of the accelerator opening degree of the driver calculated by the driving operation amount detection unit 101 and the engine rotation speed calculated by the engine rotation speed calculation unit 102, and calculates a target throttle opening degree from the target torque.

An allowable generation torque calculation unit (allowable generation torque calculation unit 110) calculates allowable generation torque that can be generated by the drive source (engine 201). Therefore, the allowable generation torque calculation unit 110 calculates the allowable generation torque on the basis of the accelerator opening degree of the driver calculated by the driving operation amount detection unit 101 and the engine rotation speed calculated by the engine rotation speed calculation unit 102. Further, the allowable generation torque calculation unit 110 also calculates an allowable generation torque change amount used for abnormality detection to be described later.

An estimated generation torque calculation unit (estimated generation torque calculation unit 111) calculates estimated generation torque estimated as being generated by the drive source (engine 201) of the vehicle. Therefore, the estimated generation torque calculation unit 111 calculates the estimated generation torque on the basis of the engine rotation speed calculated by the engine rotation speed calculation unit 102 and the engine load calculated by the cylinder inflow air amount calculation unit 103. Further, the estimated generation torque calculation unit 111 also calculates an estimated generation torque change amount used for the abnormality detection to be described later.

An abnormality detection unit 112 performs the abnormality detection by using the allowable generation torque change amount and the estimated generation torque change amount described above. A configuration example and an operation example of the abnormality detection unit 112 will be described later with reference to FIG. 4 and subsequent drawings.

A fuel correction unit 113 corrects the basic fuel amount calculated by the basic fuel amount calculation unit 104 by using an engine water temperature for each cylinder of the engine 201 and corrects an air-fuel ratio feedback coefficient of the air-fuel ratio correction coefficient calculation unit 107.

The 1-cylinder fuel injection unit 116 to the 4-cylinder fuel injection unit 119 inject fuel into the cylinders of the engine 201, respectively, on the basis of the basic fuel amount corrected by the fuel correction unit 113.

An ignition timing correction unit 114 corrects the basic ignition timing determined by the basic ignition timing calculation unit 105 by using the engine water temperature for each cylinder of the engine 201, and performs a control in advance or in retard.

The 1-cylinder ignition unit 120 to the 4-cylinder ignition unit 123 ignite fuel mixture gas flowing into the cylinder according to the basic ignition timing of the engine 201 corrected by the ignition timing correction unit 114.

An electronically-controlled throttle control unit 115 controls an electronically-controlled throttle so that a throttle opening degree for securing the target flow rate during idling described above and the target throttle opening degree calculated by the target throttle opening degree calculation unit 109 are reached. Further, the electronically-controlled throttle control unit 115 controls the electronically-controlled throttle so as to eliminate the abnormality when the abnormality detection unit 112 detects a torque increase abnormality of the engine 201.

Next, an example of a configuration of an auxiliary device provided on the periphery of the engine 201 will be described.

Figure 2:
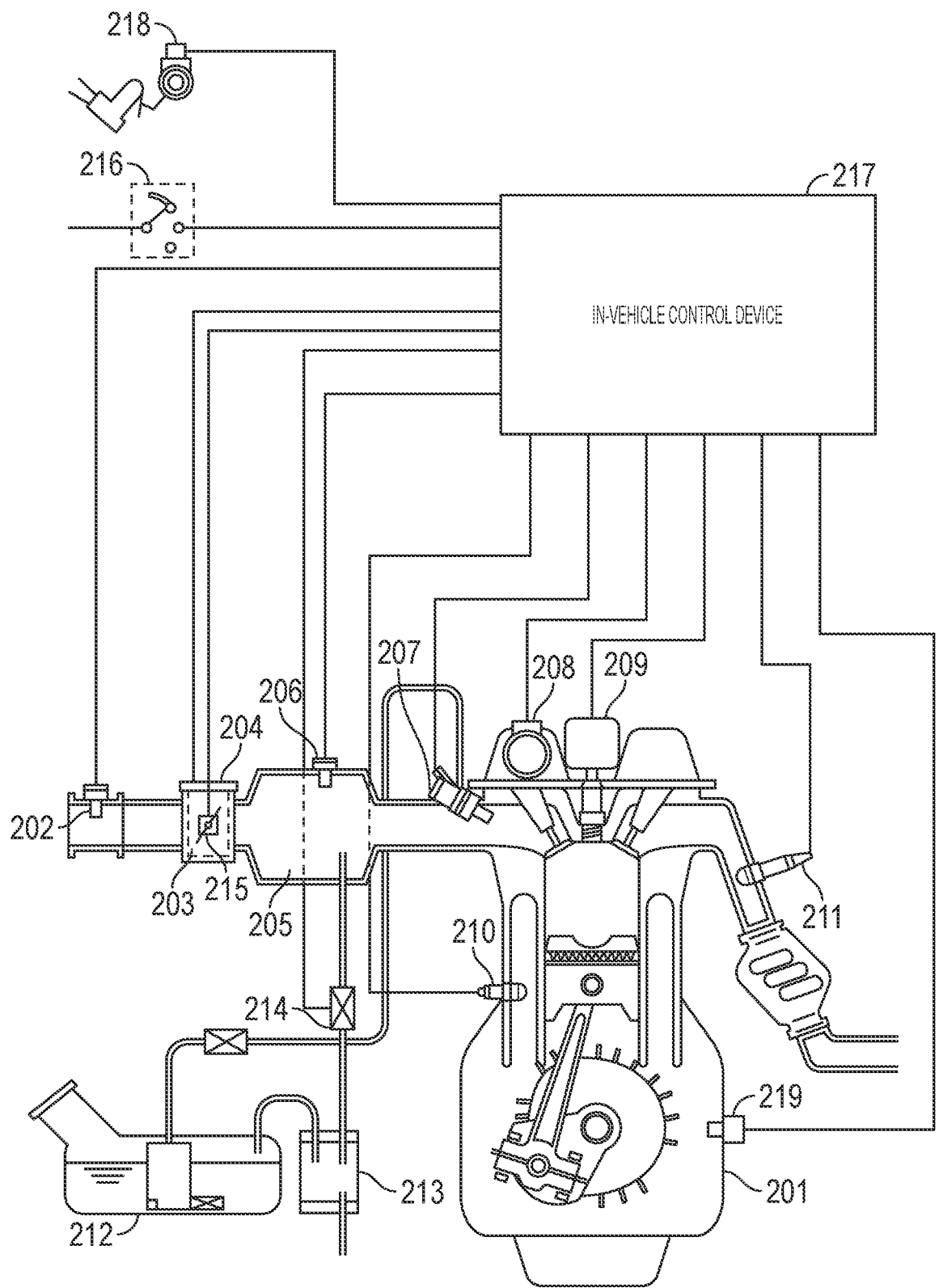
FIG. 2 is a schematic diagram illustrating an example of a configuration of an auxiliary device provided on the periphery of an engine according to the first embodiment of the present invention.

FIG. 2 is a schematic diagram illustrating an example of the configuration of the auxiliary device provided on the periphery of the engine 201.

The engine 201 includes the intake air amount sensor (thermal air flow meter) 202 that measures the amount of air taken in by the engine 201, and a throttle valve 203 that adjusts the flow rate of the air taken in by the engine 201. Further, the engine 201 includes an electronically-controlled throttle motor 204 that operates the throttle valve 203, a throttle opening degree sensor 215 that detects the opening degree of the throttle valve 203, and the intake pipe pressure sensor 206 that detects the pressure in an intake pipe installed in the intake pipe 205. Further, the engine 201 includes a fuel injection valve 207 (the 1-cylinder fuel injection unit 116 to the 4-cylinder fuel injection unit 119 illustrated in FIG. 1) for supplying the fuel required by the engine 201.

Further, the engine 201 includes the crank angle sensor 219 that recognizes a protrusion provided at a predetermined crank angle position in order to calculate the rotation speed of the engine 201. Further, the engine 201 includes a cam angle sensor 208 for recognizing a protrusion provided at a predetermined cam angle position, in addition to the crank angle sensor 219, in order to recognize the process of the engine 201. Further, the engine 201 includes an ignition module 209 (the 1-cylinder ignition unit 120 to 4-cylinder ignition unit 123 illustrated in FIG. 1) that supplies, on the basis of an ignition signal of the in-vehicle control device 217, ignition energy to a spark plug that ignites the fuel mixture gas supplied into the cylinder.

Further, the engine 201 includes a water temperature sensor 210 that is installed in a cylinder block of the engine 201 and detects a cooling water temperature of the engine 201, and the air-fuel ratio sensor 211 that is installed in front of a catalyst of the exhaust pipe of the engine 201 and outputs a linear electric signal for an oxygen concentration in exhaust gas.

In the vehicle, a canister purge tank 213 in which fuel gas that evaporates from the fuel tank 212 is adsorbed and held by charcoal or the like, and a canister purge valve 214 whose opening degree is adjusted to allow the fuel gas adsorbed and held in the canister purge tank 213 to flow into the intake pipe are provided. Further, in the vehicle, an ignition key switch 216 which is a main switch for starting and stopping the engine 201, and an accelerator opening degree sensor 218 that detects the accelerator opening degree of the driver are provided.

Each auxiliary device illustrated in FIG. 2 is connected to the in-vehicle control device 217 that controls each auxiliary device of the engine 201. The in-vehicle control device 217 receives a signal transmitted from each auxiliary device, performs various computations and pieces of processing, and transmits a drive signal to a necessary auxiliary device to control the operation of the auxiliary device.

Figure 3:
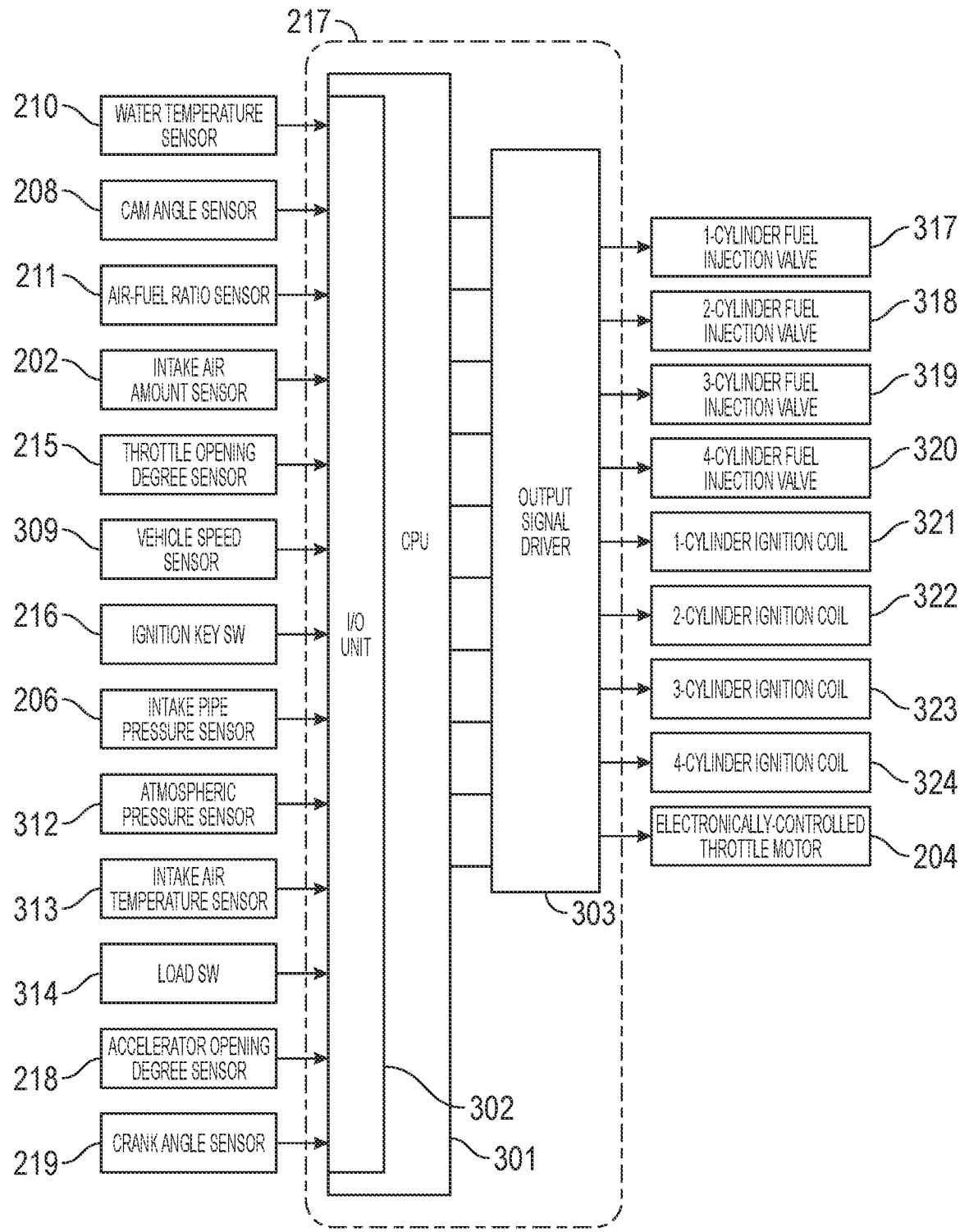
FIG. 3 is a block diagram illustrating an example of a hardware configuration of the in-vehicle control device according to the first embodiment of the present invention.

FIG. 3 is a block diagram illustrating an example of a hardware configuration of the in-vehicle control device 217.

An I/O unit 302 that converts an electric signal of each sensor installed in the engine 201 into a signal for digital computation processing, and converts a control signal for digital computation into a drive signal of an actual actuator is provided in a central processing unit (CPU) 301 provided in the in-vehicle control device 217.

Each signal from the water temperature sensor 210, the cam angle sensor 208, the air-fuel ratio sensor 211, the intake air amount sensor (thermal air flow meter) 202, the throttle opening degree sensor 215, a vehicle speed sensor 309 that measures the vehicle speed of the vehicle, the ignition key switch 216, the intake pipe pressure sensor 206, an atmospheric pressure sensor 312, an intake air temperature sensor 313, a load SW 314 (for example, an air conditioner switch), the accelerator opening degree sensor 218, and the crank angle sensor 219 is input to the I/O unit 302.

An output signal driver 303 is connected to the CPU 301. Therefore, the CPU 301 performs a predetermined computation or processing on the basis of each signal input from the I/O unit 302 and then inputs a drive signal to the output signal driver 303. The output signal driver 303 transmits an output signal to the 1-cylinder fuel injection valve 317 to the 4-cylinder fuel injection valve 320, a 1-cylinder ignition coil 321 to a 4-cylinder ignition coil 324, and the electronically-controlled throttle motor 204.

Figure 4:
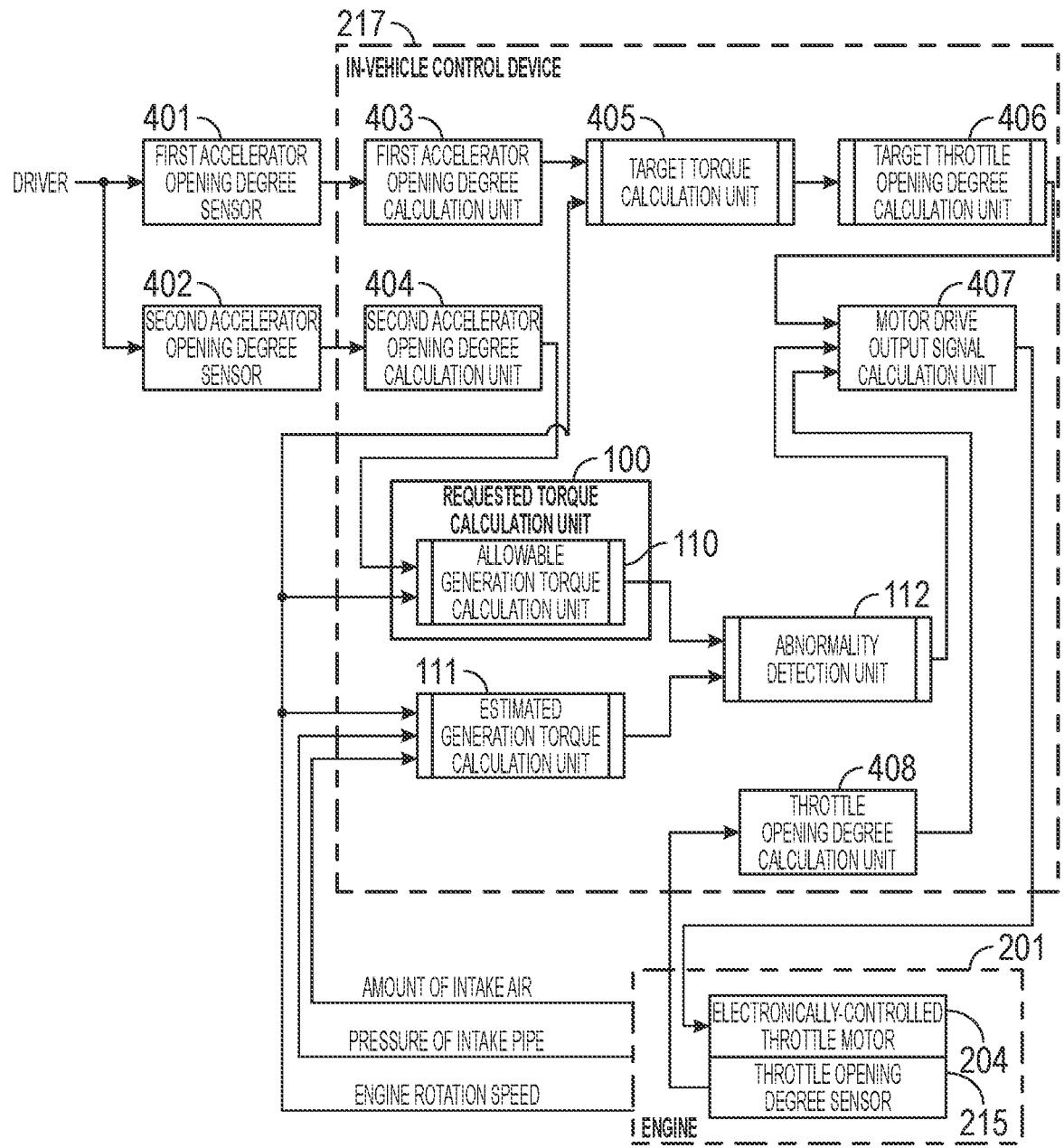
FIG. 4 is a block diagram illustrating an example of an internal configuration of the in-vehicle control device focusing on a portion for detecting an abnormality of the engine according to the first embodiment of the present invention.

FIG. 4 is a block diagram illustrating an example of an internal configuration of the in-vehicle control device 217 focusing on a portion for detecting the torque increase abnormality of the engine 201. The processing of each part illustrated in FIG. 4 is implemented by a program executed by the CPU 301 illustrated in FIG. 3.

The accelerator opening degree sensor 218 illustrated in FIG. 1 includes a first accelerator opening degree sensor 401 and a second accelerator opening degree sensor 402. Both the first accelerator opening degree sensor 401 and the second accelerator opening degree sensor 402 are provided on an accelerator pedal and each sense the operation amount of the accelerator operated according to the driver's intention. Outputs from the first accelerator opening degree sensor 401 and the second accelerator opening degree sensor 402 have almost the same value.

The value sensed by the first accelerator opening degree sensor 401 is output to a first accelerator opening degree calculation unit 403, and the value sensed by the second accelerator opening degree sensor 402 is output to a second accelerator opening degree calculation unit 404. Note that the first accelerator opening degree calculation unit 403 and the second accelerator opening degree calculation unit 404 are included in the driving operation amount detection unit 101 of FIG. 1.

The first accelerator opening degree calculation unit 403 calculates a first accelerator opening degree on the basis of the output sensed by the first accelerator opening degree sensor 401. The first accelerator opening degree is used by the target torque calculation unit 405 to calculate the target torque targeted by the driver.

Therefore, the target torque calculation unit (target torque calculation unit 405) calculates the target torque on the basis of the accelerator opening degree (first accelerator opening degree) and the rotation speed of the drive source (engine 201).

The target throttle opening degree calculation unit (target throttle opening degree calculation unit 406) calculates the target throttle opening degree on the basis of the target torque. The target throttle opening degree is used to control the opening degree of the throttle valve 203 (see FIG. 2).

A motor drive output signal calculation unit (motor drive output signal calculation unit 407) calculates a motor drive output signal for driving the throttle motor (electronically-controlled throttle motor 204) that opens the throttle valve (throttle valve 203) at the target throttle opening degree.

The electronically-controlled throttle motor 204 opens and closes the throttle valve 203 attached to the intake system of the engine 201 on the basis of the motor drive output signal output by the motor drive output signal calculation unit 407.

The throttle opening degree sensor 215 senses the amount of operation of the throttle valve 203 and outputs a sensor signal to a throttle opening degree calculation unit 408.

The throttle opening degree calculation unit (throttle opening degree calculation unit 408) calculates the throttle opening degree on the basis of the sensor signal input from the throttle opening degree sensor (throttle opening degree sensor 215) that detects the throttle opening degree of the throttle valve (throttle valve 203). At this time, the amount of operation of the throttle valve 203 is calculated as an actual throttle opening degree.

Then, the motor drive output signal calculation unit (motor drive output signal calculation unit 407) performs a feedback control for the motor drive output signal so that the throttle opening degree reaches the target throttle opening degree on the basis of the target throttle opening degree, abnormality determination, and the throttle opening degree. At this time, the motor drive output signal calculation unit 407 compares the actual throttle opening degree input from the throttle opening degree calculation unit 408 with the target throttle opening degree input from the target throttle opening degree calculation unit 406. Then, the motor drive output signal calculation unit 407 performs a feedback control for the motor drive output signal so that the actual throttle opening degree reaches the target throttle opening degree. As a result, the electronically-controlled throttle motor 204 controls the throttle opening degree of the throttle valve 203 so that the actual throttle opening degree reaches the target throttle opening degree.

Note that the motor drive output signal calculation unit (motor drive output signal calculation unit 407) performs fail-safe processing for reducing the torque generated by the drive source (engine 201) when the abnormality determination is input. As a result, the output of the engine 201 that has been determined to be abnormal can reduced, thereby suppressing the torque abnormality of the engine 201.

Note that the target torque calculation unit 405, the target throttle opening degree calculation unit 406, the motor drive output signal calculation unit 407, and the throttle opening degree calculation unit 408 described above are included in the target throttle opening degree calculation unit 109 in FIG. 1.

Meanwhile, the second accelerator opening degree calculation unit 404 calculates a second accelerator opening degree on the basis of the output sensed by the second accelerator opening degree sensor 402.

In a case where requested torque is used for processing, a requested torque calculation unit (requested torque calculation unit 100) calculates the requested torque on the basis of the driving state of the vehicle. Note that the requested torque collectively refers to, for example, the target torque and the allowable generation torque. The driving state of the vehicle includes, for example, the second accelerator opening degree and the engine rotation speed, but the driving state of the vehicle may also include other parameters. Therefore, the requested torque calculation unit 100 can calculate the requested torque by using parameters other than the second accelerator opening degree and the engine rotation speed.

On the other hand, in a case where the allowable generation torque is used for processing, the requested torque calculation unit (requested torque calculation unit 100) is the allowable generation torque calculation unit (allowable generation torque calculation unit 110) which calculates the allowable generation torque that can be generated by the drive source (engine 201). The allowable generation torque calculation unit 110 calculates the allowable generation torque on the basis of the second accelerator opening degree input from the second accelerator opening degree calculation unit 404 and the engine rotation speed, and also calculates an allowable generation torque change amount over a predetermined time.

The estimated generation torque calculation unit 111 estimates the torque generated by the engine 201 on the basis of the amount of intake air, the pressure of the intake pipe, and the engine rotation speed that indicate the state of the engine 201, and also calculates an estimated generation torque change amount over a predetermined time.

Finally, the abnormality detection unit 112 detects an abnormality (for example, the torque increase abnormality) of the drive source (engine 201).

In a case where the requested torque is used for processing, the abnormality detection unit (abnormality detection unit 112) detects the abnormality of the drive source (engine 201) on the basis of the integrated value of a difference between a requested torque change amount and the estimated generation torque change amount, and outputs the abnormality determination for the drive source (engine 201).

Further, in a case where the allowable generation torque is used for processing, the abnormality detection unit (abnormality detection unit 112) detects the abnormality of the drive source (engine 201) on the basis of a result of comparing the integrated value of a difference between the allowable generation torque change amount and the estimated generation torque change amount with a threshold value determined from the operation state of the drive source (engine 201). At this time, the abnormality detection unit 112 monitors whether or not the torque generated by the engine 201 exceeds the target torque intended by the driver, on the basis of the allowable generation torque calculated by the allowable generation torque calculation unit 110 or the allowable generation torque change amount over a predetermined time, and the estimated generation torque calculated by the estimated generation torque calculation unit 111, or the estimated generation torque change amount over a predetermined time.

When the abnormality detection unit 112 detects the torque increase abnormality of the engine 201 and outputs the abnormality determination, the motor drive output signal calculation unit 407 operates the throttle valve 203 so as to suppress the output of the engine 201. For example, the motor drive output signal calculation unit 407 drives the electronically-controlled throttle motor 204 so that the throttle valve 203 is operated so as to suppress the output of the engine 201, or stops the electronically-controlled throttle motor 204 to mechanically operate the throttle valve 203.

Figure 5:
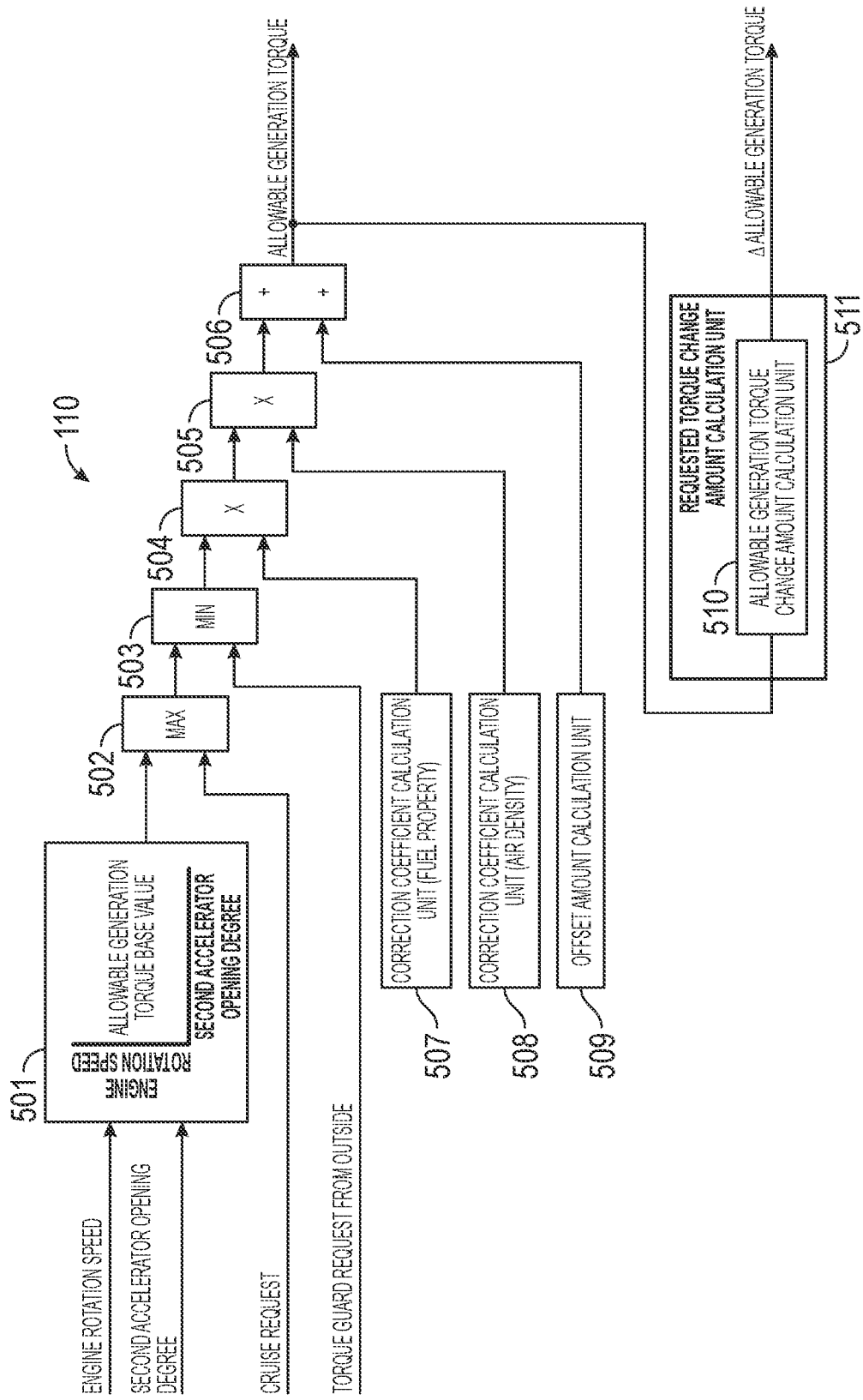
FIG. 5 is a block diagram illustrating an example of a schematic configuration of an allowable generation torque calculation unit according to the first embodiment of the present invention.

FIG. 5 is a block diagram illustrating an example of a schematic configuration of the allowable generation torque calculation unit 110 illustrated in FIG. 4.

An allowable generation torque base value calculation unit 501 calculates an allowable generation torque base value on the basis of the engine rotation speed and the second accelerator opening degree that are input.

A selection unit 502 selects the larger one of the allowable generation torque base value calculated by the allowable generation torque base value calculation unit 501 and a cruise-requested torque, thereby coping with the calculation of the allowable generation torque during cruise.

The selection unit 503 selects the smaller one of a torque guard request input from the outside and the allowable generation torque calculated by the selection unit 502, thereby calculating the allowable generation torque considering the torque guard request from the outside.

A fuel-property-specific correction coefficient calculation unit 507 calculates a correction coefficient for considering the amount of change in generation torque of the engine 201 according to a fuel property.

An integration unit 504 integrates the correction coefficient calculated by the correction coefficient calculation unit 507 with the allowable generation torque calculated by the selection unit 503 to calculate the allowable generation torque corresponding to the change in generation torque according to the fuel property.

An air-density-specific correction coefficient calculation unit 508 calculates a correction coefficient for considering the amount of change in generation torque of the engine 201 according to an air density.

An integration unit 505 integrates the correction coefficient calculated by the correction coefficient calculation unit 508 with the allowable generation torque calculated by the integration unit 504 to calculate the allowable generation torque corresponding to the change in generation torque according to the air density.

An offset amount calculation unit 509 calculates the offset amount of the allowable generation torque.

An offset amount adding unit 506 adds the offset amount calculated by the offset amount calculation unit 509 to the allowable generation torque calculated by the integration unit 505, thereby preventing the estimated generation torque from exceeding the allowable generation torque in a normal state, in consideration of a calculation error of the estimated generation torque to be described later.

Finally, an allowable generation torque change amount calculation unit (allowable generation torque change amount calculation unit 510) calculates, as an allowable generation torque change amount ($\Delta$ allowable generation torque), the amount of change in allowable generation torque per unit time. The allowable generation torque calculated by the offset amount adding unit 506 and the allowable generation torque change amount over a predetermined time ($\Delta$ allowable generation torque) calculated by the allowable generation torque change amount calculation unit 510 are used in abnormality detection processing performed by the abnormality detection unit 112.

Here, in a case where the requested torque is used for processing, a requested torque change amount calculation unit (requested torque change amount calculation unit 511) calculates, as a requested torque change amount ($\Delta$ requested torque), the amount of change in requested torque per unit time.

Figure 6:
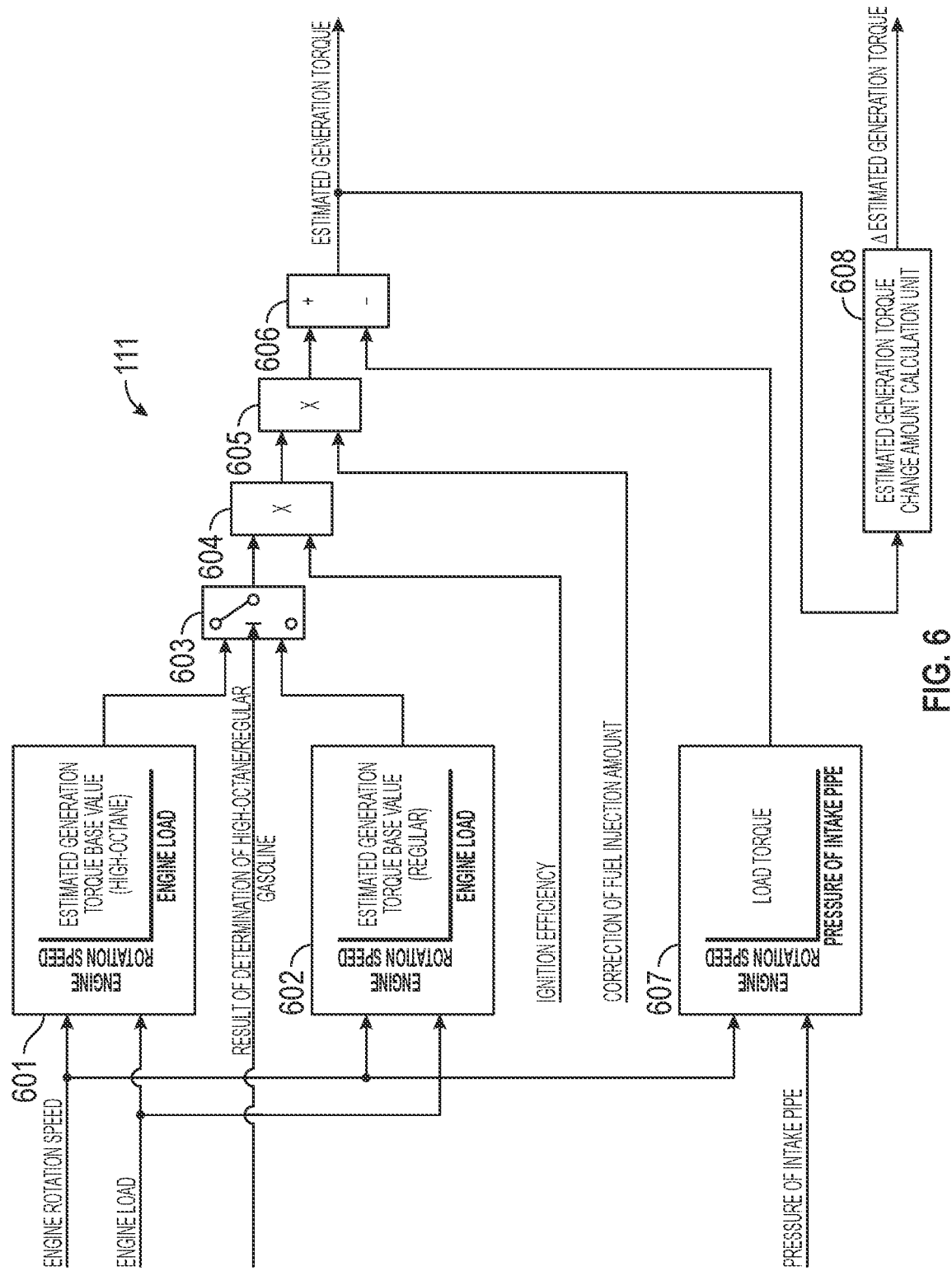
FIG. 6 is a block diagram illustrating an example of a schematic configuration of an estimated generation torque calculation unit according to the first embodiment of the present invention.

FIG. 6 is a block diagram illustrating an example of a schematic configuration of the estimated generation torque calculation unit 111 illustrated in FIG. 4.

An estimated generation torque calculation unit (high-octane) 601 calculates an estimated generation torque base value when the fuel is high-octane gasoline on the basis of the engine rotation speed and the engine load.

An estimated generation torque calculation unit (regular) 602 calculates an estimated generation torque base value when the fuel is regular gasoline on the basis of the engine rotation speed and the engine load.

An estimated generation torque base value selection unit 603 selects a corresponding estimated generation torque base value on the basis of a result of determining a property of gasoline that the vehicle uses, that is, a determination result indicating whether the property of gasoline is high-octane or regular.

An integration unit 604 integrates an ignition efficiency with the estimated generation torque base value in consideration of the influence of an ignition timing at the time of measuring the estimated generation torque base value selected by the estimated generation torque base value selection unit 603. For example, when the ignition timing at the time of measuring the estimated generation torque base value is used as a reference ignition timing, in a case of an ignition timing on a retard side with respect to the reference ignition timing, the ignition efficiency is smaller than 1.0. As a result, the estimated generation torque is calculated to be small by the integration unit 604.

An integration unit 605 integrates a fuel injection amount correction value with the estimated generation torque calculated by the integration unit 604. For example, the integration unit 605 integrates the correction value set to 0 with the estimated generation torque during fuel cut operation to set the fuel injection amount correction value to 0 so that the estimated generation torque during the fuel cut operation becomes 0. The reason why the fuel injection amount correction value is set to 0 as described above is to match the phenomenon that the generation torque of the engine 201 becomes 0 when the fuel is not injected.

A load torque calculation unit 607 calculates a load torque on the basis of the engine rotation speed and the pressure of the intake pipe.

A subtracting unit 606 subtracts the load torque from the estimated generation torque calculated by the integration unit 605, thereby calculating the estimated generation torque as shaft torque of the engine 201.

Finally, an estimated generation torque change amount calculation unit (estimated generation torque change amount calculation unit 608) calculates, as an estimated generation torque change amount ($\Delta$ estimated generation torque), the amount of change in estimated generation torque per unit time. At this time, the estimated generation torque change amount calculation unit 608 calculates the estimated generation torque change amount over a predetermined time calculated by the subtracting unit 606. The estimated generation torque calculated by the subtracting unit 606 and the estimated generation torque change amount over a predetermined time ($\Delta$ estimated generation torque) calculated by the estimated generation torque change amount calculation unit 608 are used in the abnormality detection processing performed by the abnormality detection unit 112.

Figure 7:
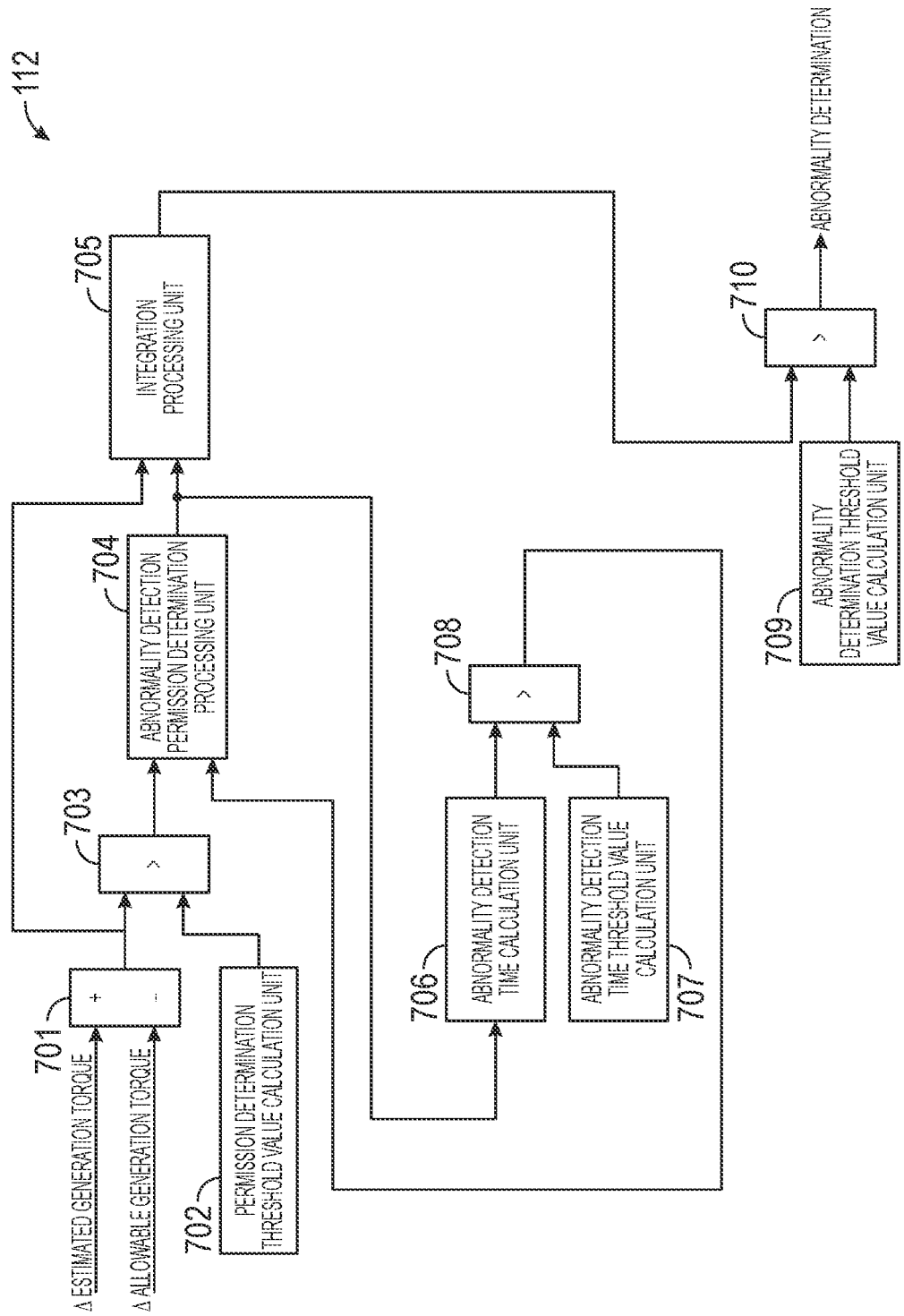
FIG. 7 is a block diagram illustrating an example of a schematic configuration of an abnormality detection unit according to the first embodiment of the present invention.

FIG. 7 is a block diagram illustrating an example of a schematic configuration of the abnormality detection unit 112 illustrated in FIG. 4.

The abnormality detection unit (abnormality detection unit 112) determines that the abnormality detection is permitted in a case where a difference between the allowable generation torque change amount ($\Delta$ allowable generation torque) and the estimated generation torque change amount ($\Delta$ estimated generation torque) is larger than a permission determination threshold value, calculates, as an abnormality detection time, a time in which it is determined that the abnormality detection is permitted, and continues the calculation of the abnormality detection time until the abnormality detection time reaches an abnormality determination time threshold value.

Here, the permission determination threshold value is used by the abnormality detection unit (abnormality detection unit 112) to determine the permission for the abnormality detection of the drive source (engine 201), and varies depending on the vehicle speed of the vehicle and a predetermined time. Since a different threshold value is used for each $\Delta$ (predetermined time) when calculating the $\Delta$ estimated generation torque and the $\Delta$ allowable generation torque, the permission determination threshold value varies depending on a predetermined time used when the $\Delta$ estimated generation torque and the $\Delta$ allowable generation torque are calculated. Note that the permission determination threshold value may vary depending on the rotation speed of the drive source (engine 201) and a predetermined time.

Further, the abnormality determination time threshold value is used to limit a time in which the difference between the requested torque change amount and the estimated generation torque change amount is integrated.

Hereinafter, the contents of specific processing performed in each part of the abnormality detection unit 112 will be described.

First, a difference calculation unit 701 calculates a difference between the allowable generation torque change amount over a predetermined time ($\Delta$ allowable generation torque) calculated by the allowable generation torque change amount calculation unit 510 (see FIG. 5) and the estimated generation torque change amount over a predetermined time ($\Delta$ estimated generation torque) calculated by the estimated generation torque change amount calculation unit 608 (see FIG. 6). Then, the difference calculation unit 701 outputs the difference between the Δ estimated generation torque and the Δ allowable generation torque to a comparison unit 703 and an integration processing unit 705.

A permission determination threshold value calculation unit 702 calculates a threshold value (permission determination threshold value) used by an abnormality detection permission determination processing unit 704 to determine the permission for the detection of the torque abnormality of the engine 201.

The comparison unit 703 compares the difference between the Δ estimated generation torque and the Δ allowable generation torque calculated by the difference calculation unit 701 with the permission determination threshold value calculated by the permission determination threshold value calculation unit 702. Then, when the difference between the Δ estimated generation torque and the Δ allowable generation torque is larger than the permission determination threshold value, a determination result is output.

The abnormality detection permission determination processing unit 704 determines that the abnormality detection is permitted on the basis of the determination result indicating that the difference between the Δ estimated generation torque and the Δ allowable generation torque input from the comparison unit 703 is larger than the permission determination threshold value. The abnormality detection permission determination processing unit 704 determines that the abnormality detection is permitted in a period until the abnormality detection permission is cleared, which is input from a comparison unit 708. The abnormality detection permission determination processing unit 704 outputs the determined abnormality detection permission to the integration processing unit 705 and an abnormality detection time calculation unit 706.

The integration processing unit 705 integrates the difference between the Δ estimated generation torque and the Δ allowable generation torque input from the difference calculation unit 701 while the abnormality detection permission is input. Then, the integration processing unit 705 outputs, to the comparison unit 710, the integrated value of the difference between the Δ estimated generation torque and the Δ allowable generation torque.

The abnormality detection time calculation unit 706 calculates a time (hereinafter, referred to as "abnormality detection time") in which the abnormality detection permission determination processing unit 704 determines that the abnormality detection is permitted. The abnormality detection time corresponds to, for example, a time measured by a timer (not illustrated) included in the abnormality detection time calculation unit 706.

An abnormality determination time threshold value calculation unit 707 calculates a threshold value (abnormality determination time threshold value) for determining the length of the abnormality detection time used in the comparison unit 708.

The comparison unit 708 compares the abnormality detection time input from the abnormality detection time calculation unit 706 with the abnormality determination time threshold value input from the abnormality determination time threshold value calculation unit 707. Then, when the abnormality detection time is greater than the abnormality determination time threshold value, the comparison unit 708 clears the determination made by the abnormality detection permission determination processing unit 704 that the abnormality detection is permitted. In addition, the comparison unit 708 also clears the integrated value of the difference between the Δ estimated generation torque and the Δ allowable generation torque, calculated by the integration processing unit 705. For example, the fact that the comparison unit 708 has cleared the determination that the abnormality detection is permitted has been cleared is output to the abnormality detection permission determination processing unit 704, and once the abnormality detection permission determination processing unit 704 notifies the integration processing unit 705 of the fact that the determination that the abnormality detection is permitted has been cleared, the integration processing unit 705 clears the integrated value.

An abnormality determination threshold value calculation unit 709 calculates an abnormality determination threshold value. The abnormality determination threshold value is used by the abnormality detection unit (abnormality detection unit 112) to detect an abnormality of the drive source (engine 201) on the basis of the integrated value (the integrated value of the difference between the Δ estimated generation torque and the Δ allowable generation torque) and varies depending on the vehicle speed. Note that the abnormality determination threshold value may vary depending on the rotation speed of the drive source (engine 201).

The comparison unit 710 compares the integrated value of the difference between the Δ estimated generation torque and the Δ allowable generation torque calculated by the integration processing unit 705 with the abnormality determination threshold value input from the abnormality determination threshold value calculation unit 709. Here, the integrated value (the integrated value of the difference between the Δ estimated generation torque and the Δ allowable generation torque) is near zero when the drive source (engine 201) is in a normal state, and the integrated value becomes larger than the abnormality determination threshold value when the drive source (engine 201) is in an abnormal state.

Therefore, when the integrated value of the difference between the Δ estimated generation torque and the Δ allowable generation torque becomes larger than the abnormality determination threshold value, the comparison unit 710 outputs the result of the abnormality determination to the motor drive output signal calculation unit 407 (see FIG. 4). Outputting the abnormality determination by the comparison unit 710 is equivalent to detecting an abnormality by the abnormality detection unit 112. In this way, the abnormality detection unit (abnormality detection unit 112) calculates the integrated value (the integrated value of the difference between the Δ estimated generation torque and the Δ allowable generation torque) while it is determined that the abnormality detection is permitted, and when the integrated value becomes larger than the abnormality determination threshold value determined on the basis of the operation state of the drive source (engine 201), the abnormality of the drive source (engine 201) is detected, and the abnormality determination is output.

Once the abnormality detection unit 112 outputs the abnormality determination to the motor drive output signal calculation unit 407, the motor drive output signal calculation unit 407 calculates the motor drive output signal so that the throttle valve 203 is closed. Then, the motor drive output signal is output to the electronically-controlled throttle motor 204, the opening degree of the throttle valve 203 is controlled, and the throttle valve 203 is closed.

Note that a method for detecting the torque increase abnormality of the engine 201 is not limited to a method in which the detection is performed by the abnormality detection unit 112 illustrated in FIG. 7. Therefore, a configuration example and an operation example of abnormality detection units 112A and 410B that can perform other methods for detecting the torque increase abnormality of the engine 201 will be described with reference to FIGS. 8 and 9.

First Modified Example of Abnormality Detection Unit

Figure 8:
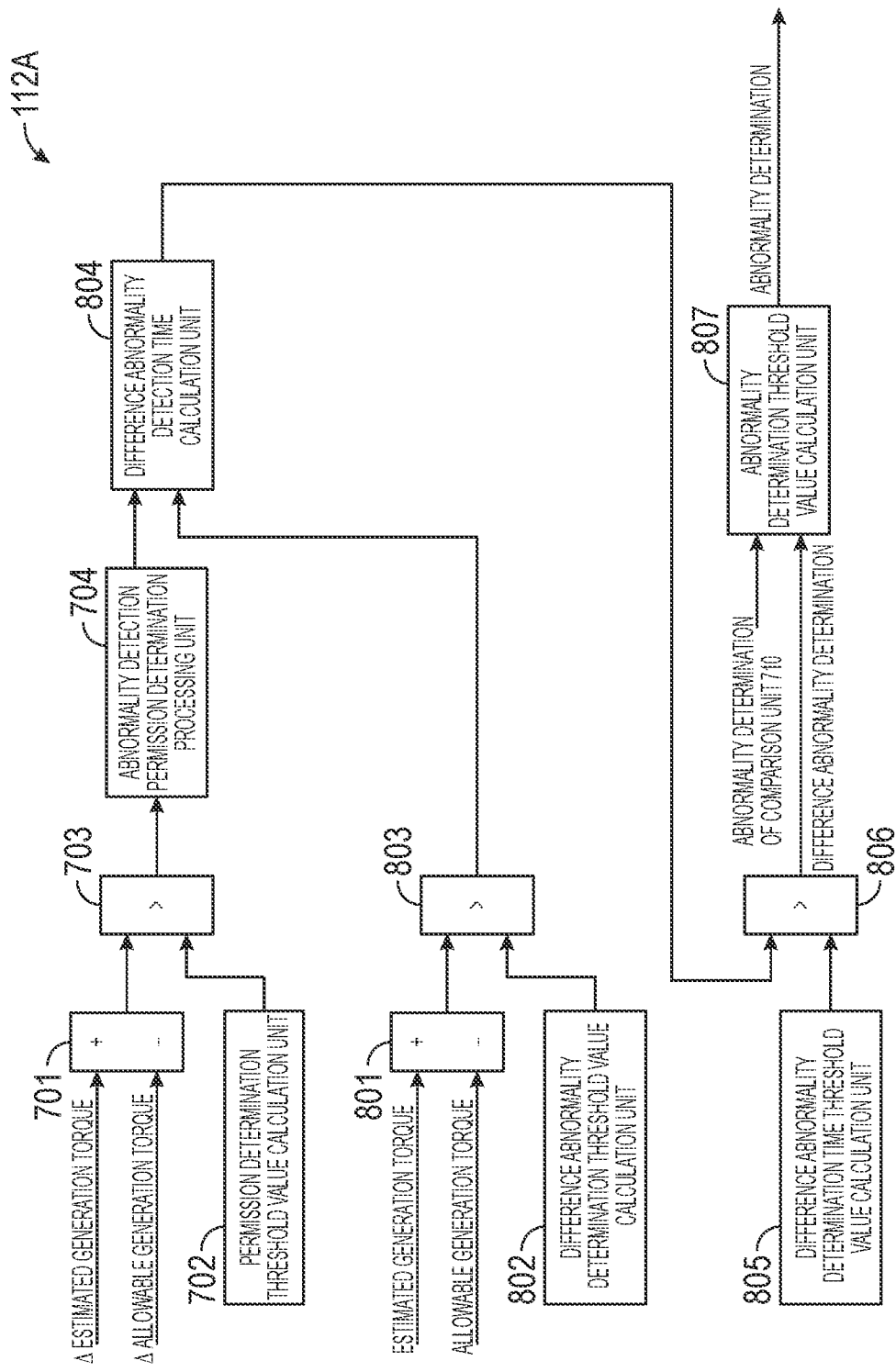
FIG. 8 is a block diagram illustrating an example of a schematic configuration of an abnormality detection unit according to a modified example of the first embodiment of the present invention.

FIG. 8 is a block diagram illustrating an example of a schematic configuration of the abnormality detection unit 112A. The abnormality detection unit 112A illustrated in FIG. 8 performs an abnormality detection method in which the state of the difference between the estimated generation torque and the allowable generation torque is monitored while also using the abnormality determination output from the comparison unit 710 as already described above with reference to FIG. 7. This method is performed in order to deal with a state in which the abnormality of the engine 201 cannot be detected only by the method in which the detection is performed by the abnormality detection unit 112 described above with reference to FIG. 7. Therefore, the abnormality detection unit 112 of FIG. 7 and the abnormality detection unit 112A of FIG. 8 may be operated in parallel.

Here, the abnormality detection unit (abnormality detection unit 112A) according to the first modified example compares a difference abnormality detection time calculated when the difference between the estimated generation torque and the allowable generation torque is larger than a difference abnormality determination threshold value while it is determined that the abnormality detection is permitted, with a difference abnormality determination time threshold value, and determines that the difference is abnormal when the difference abnormality detection time is greater than the difference abnormality determination time threshold value. As a result, the abnormality detection unit 112A can detect an abnormal deviation between the estimated generation torque and the allowable generation torque as an abnormality.

Then, the abnormality detection unit (abnormality detection unit 112A) outputs the abnormality determination considering the state of the difference between the estimated generation torque and the allowable generation torque on the basis of the determined difference abnormality and the abnormality determination output on the basis of the integrated value (the integrated value of the difference between the Δ estimated generation torque and the Δ allowable generation torque). Since it is also possible to perform the determination of the difference abnormality, in addition to the abnormality determination of the integrated value as described above, it is possible to reliably determine the abnormality of the drive source (engine 201). Therefore, the abnormality detection unit (abnormality detection unit 112A) can prevent the normal drive source (engine 201) from being determined as being abnormal. An example of specific processing in each part of the abnormality detection unit 112A will be described below.

The operations of a difference calculation unit 701, a permission determination threshold value calculation unit 702, a comparison unit 703, and an abnormality detection permission determination processing unit 704 included in the abnormality detection unit 112A are the same as the operations of the corresponding parts of the abnormality detection unit 112 illustrated in FIG. 7. Further, the abnormality detection permission determined by the abnormality detection permission determination processing unit 704 is output to a difference abnormality detection time calculation unit 804.

A difference calculation unit 801 calculates the difference between the estimated generation torque calculated by the estimated generation torque calculation unit 111 and the allowable generation torque calculated by the allowable generation torque calculation unit 110.

A difference abnormality determination threshold value calculation unit 802 calculates a threshold value (difference abnormality determination threshold value) used by a comparison unit 803 to determine the abnormality of the difference between the estimated generation torque and the allowable generation torque.

The comparison unit 803 compares the difference between the estimated generation torque and the allowable generation torque calculated by the difference calculation unit 801 with the difference abnormality determination threshold value calculated by the difference abnormality determination threshold value calculation unit 802. When the difference between the estimated generation torque and the allowable generation torque is larger than the difference abnormality determination threshold value, the comparison unit 803 determines that the difference is abnormal and outputs the occurrence of the difference abnormality to the difference abnormality detection time calculation unit 804.

The difference abnormality detection time calculation unit 804 calculates a time (difference abnormality detection time) in which the estimated generation torque is larger than the allowable generation torque while it is determined that the abnormality detection is permitted, on the basis of the abnormality detection permission determined by the abnormality detection permission determination processing unit 704 and the comparison result calculated by the comparison unit 803.

A difference abnormality determination time threshold value calculation unit 805 calculates the difference abnormality determination time threshold value. The difference abnormality determination time threshold value is used by the comparison unit 806 to determine that the difference is abnormal when the difference abnormality detection time is greater than the threshold value.

A comparison unit 806 compares the difference abnormality detection time calculated by the difference abnormality detection time calculation unit 804 with the difference abnormality determination time threshold value calculated by the difference abnormality determination time threshold value calculation unit 805, and outputs the comparison result to an abnormality determination processing unit 807. Here, the comparison result includes the result (difference abnormality determination) of the determination made by the comparison unit 806 that the difference is abnormal when the time in which the estimated generation torque is larger than the allowable generation torque is greater than the difference abnormality determination time threshold value.

The abnormality determination processing unit 807 performs the final abnormality determination on the basis of the abnormality determination result obtained from the integrated value of the difference between the Δ estimated generation torque and the Δ allowable generation torque output from the comparison unit 710 in FIG. 7, and the result of determining the abnormality of the difference between the estimated generation torque and the allowable generation torque output from the comparison unit 806. As a result, the abnormality determination processing unit 807 can perform the abnormality determination in consideration of the state of the difference between the estimated generation torque and the allowable generation torque. Then, the abnormality determination processing unit 807 outputs the result of the final abnormality determination to the motor drive output signal calculation unit 407 (see FIG. 4).

Second Modified Example of Abnormality Detection Unit

Figure 9:
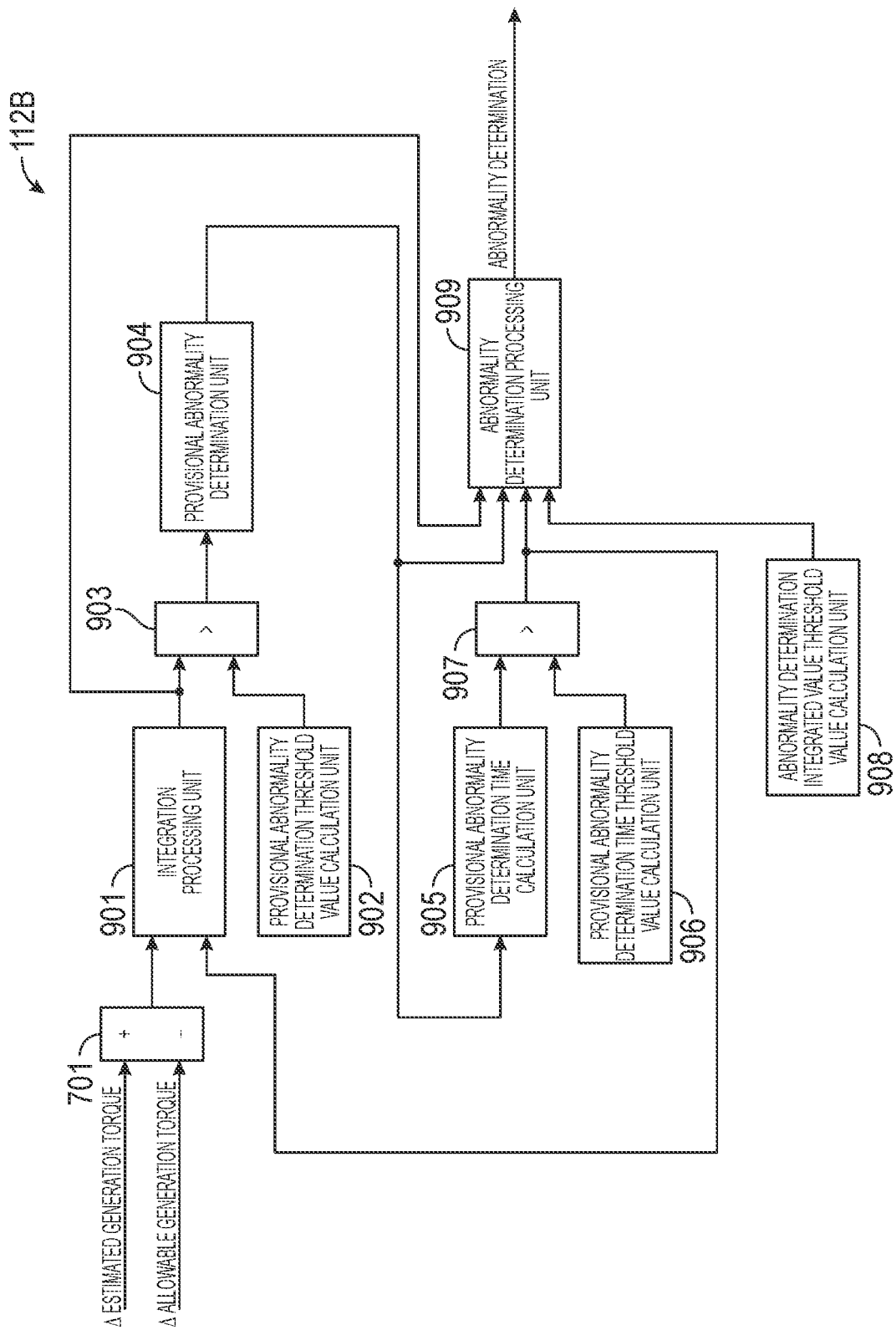
FIG. 9 is a block diagram illustrating an example of a schematic configuration of an abnormality detection unit according to a modified example of the first embodiment of the present invention.

FIG. 9 is a block diagram illustrating an example of a schematic configuration example of an abnormality detection unit 112B.

The abnormality detection unit (abnormality detection unit 112B) according to a second modified example outputs abnormality determination when a provisional abnormality determination time which is a period, in which it is determined that there is a provisional abnormality in a case where the integrated value (the integrated value of the difference between the Δ estimated generation torque and the Δ allowable generation torque) is larger than a provisional abnormality determination threshold value, is greater than a provisional abnormality determination time threshold value, and the integrated value is larger than an abnormality determination integrated value threshold value. As a result, the abnormality detection unit 112B can determine whether or not there is a provisional abnormality for the initially calculated integrated value, and then determine that the integrated value is a value calculated due to the torque increase abnormality of the engine 201. An example of specific processing in each part of the abnormality detection unit 112B will be described below.

The operation of a difference calculation unit 701 included in the abnormality detection unit 112B is the same as the operation of the difference calculation unit 701 included in the abnormality detection unit 112 illustrated in FIG. 7. Then, the difference calculation unit 701 outputs the difference between the Δ estimated generation torque and the Δ allowable generation torque that are calculated to an integration processing unit 901.

The integration processing unit 901 integrates the difference between the Δ estimated generation torque and the Δ allowable generation torque calculated by the difference calculation unit 701, and outputs the integrated value to a comparison unit 903 and an abnormality determination processing unit 909.

A period in which the integration processing unit 901 integrates the difference between the Δ estimated generation torque and the Δ allowable generation torque ends when a comparison unit 907 to be described later outputs a comparison result indicating that the provisional abnormality determination time is greater than the provisional abnormality determination time threshold value.

A provisional abnormality determination threshold value calculation unit 902 calculates a threshold value for provisional abnormality determination (provisional abnormality determination threshold value) used in the comparison unit 903.

The comparison unit 903 compares the integrated value of the difference between the Δ estimated generation torque and the Δ allowable generation torque calculated by the integration processing unit 901 with the provisional abnormality determination threshold value calculated by the provisional abnormality determination threshold value calculation unit 902, and outputs the comparison result.

A provisional abnormality determination unit 904 determines that there is a provisional abnormality when the integrated value of the difference between the Δ estimated generation torque and the Δ allowable generation torque is larger than the provisional abnormality determination threshold value, on the basis of the comparison result input from the comparison unit 903. Then, the provisional abnormality determination unit 904 outputs the provisional abnormality determination result to a provisional abnormality determination time calculation unit 905 and the abnormality determination processing unit 909.

The provisional abnormality determination time calculation unit 905 calculates a time (provisional abnormality determination time) in which the provisional abnormality determination unit 904 determines that there is a provisional abnormality on the basis of the provisional abnormality determination result input from the provisional abnormality determination unit 904. The provisional abnormality determination time corresponds to, for example, a time measured by a timer (not illustrated) included in the provisional abnormality determination time calculation unit 905.

A provisional abnormality determination time threshold value calculation unit 906 calculates the provisional abnormality determination time threshold value used in the comparison unit 907.

The comparison unit 907 compares the provisional abnormality determination time calculated by the provisional abnormality determination time calculation unit 905 with the provisional abnormality determination time threshold value calculated by the provisional abnormality determination time threshold value calculation unit 906, and outputs the comparison result to the integration processing unit 901 and the abnormality determination processing unit 909.

The abnormality determination integrated value threshold value calculation unit 908 calculates the threshold value of the integrated value for the abnormality determination (abnormality determination integrated value threshold value) used by the abnormality determination processing unit 909 and outputs the abnormality determination integrated value threshold value to the abnormality determination processing unit 909.

The integrated value of the difference between the Δ estimated generation torque and the Δ allowable generation torque is input from the integration processing unit 901 to the abnormality determination processing unit 909, and the provisional abnormality determination result is input from the provisional abnormality determination unit 904 to the abnormality determination processing unit 909.

Further, the provisional abnormality determination time comparison result is input from the comparison unit 907 to the abnormality determination processing unit 909, and the abnormality determination integrated value threshold value is input from the abnormality determination integrated value threshold value calculation unit 908 to the abnormality determination processing unit 909.

The abnormality determination processing unit 909 compares the increment of the integrated value of the difference between the Δ estimated generation torque and the Δ allowable generation torque integrated from when it is determined by the provisional abnormality determination unit 904 that there is a provisional abnormality, with the abnormality determination integrated value threshold value at a timing when it is determined that the provisional abnormality determination time is greater than the abnormality determination integrated value threshold value on the basis of the provisional abnormality determination time comparison result. Then, the abnormality determination processing unit 909 performs the final abnormality determination when the increment of the integrated value of the difference between the Δ estimated generation torque and the Δ allowable generation torque is larger than the abnormality determination integrated value threshold value. The abnormality determination processing unit 909 outputs the result of the final abnormality determination to the motor drive output signal calculation unit 407 (see FIG. 4).

Figure 10A:
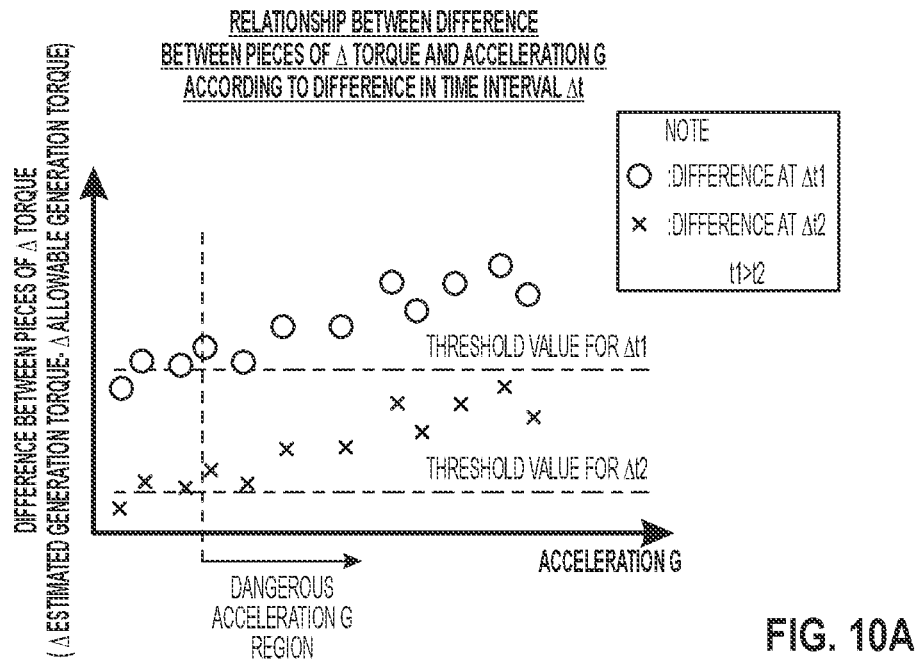
FIGS. 10A-10C illustrate graphs showing examples of the relationship between a difference between Δ torques and the acceleration G of a vehicle, and the relationship between a vehicle speed and an allowable determination threshold value according to a difference in time interval or engine rotation speed according to the first embodiment of the present invention.
Figure 10B:
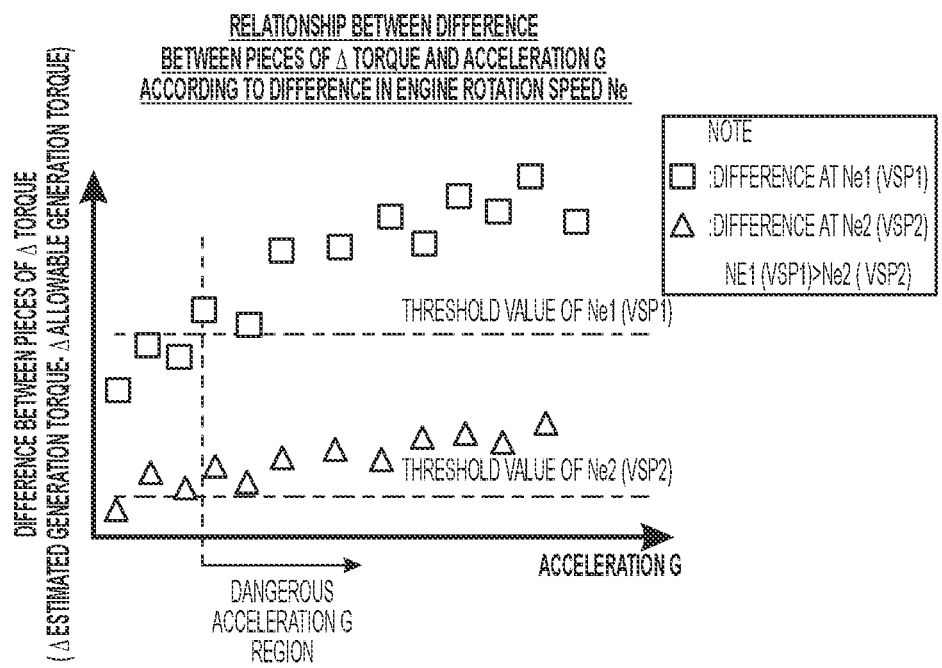
Figure 10C:
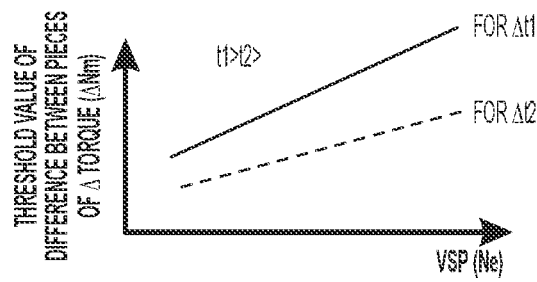

FIG. 10 illustrates graphs showing an example of the relationship between the difference between the Δ torques and the acceleration G of the vehicle, and the relationship between the vehicle speed and an allowable determination threshold value according to a difference in time interval or engine rotation speed. The difference between the Δ torques described in FIG. 10 represents the difference between the estimated generation torque change amount over a predetermined time (Δ estimated generation torque) and the allowable generation torque change amount over a predetermined time (Δ allowable generation torque).

The graph (a) in FIG. 10 shows the example of the relationship between the difference between the Δ torques and the acceleration G according to a difference in time interval Δt when the throttle valve 203 is opened stepwise in a state where a gear of a transmission is fixed and a predetermined engine rotation speed is maintained. Here, t1 and t2 are the time intervals at which the change amounts (the Δ estimated generation torque and the Δ allowable generation torque) are calculated. Further, the interval of t1 (Δt1) is set to be greater than the interval of t2 (Δt2). Note that, in the graph, the acceleration G indicated as a "dangerous acceleration G region" is, for example, 0.2 G or more.

The larger the opening degree of the throttle valve 203, the greater the acceleration G. Therefore, the difference between the Δ torques when a predetermined acceleration G is generated is larger in a case of Δt1 which is a greater time interval (indicated by a black dot mark in FIG. 10) than in a case of Δt2 which is a smaller time interval (indicated by an x mark in FIG. 10). Therefore, when it is assumed that a state where the acceleration of the vehicle is equal to or greater than the predetermined acceleration G is a state where the vehicle is in danger, it is necessary to set a plurality of threshold values (permission determination threshold values) for the permission of the detection of the dangerous state of the vehicle, that is, the abnormal state of the engine 201 for each of Δt1 and Δt2. For example, as shown in FIG. 10, a threshold value for Δt1 and a threshold value for Δt2 are set.

The graph (b) of FIG. 10 is a graph showing an example of the relationship between the difference between the Δ torques and the acceleration G according to a difference in engine rotation speed Ne, in which one time interval is used unlike the graph (a) of FIG. 10 and two engine rotation speeds (Ne1 and Ne2) are maintained. Here, Ne1 and Ne2 are engine rotation speeds at which the change amounts (Δ estimated generation torque and Δ allowable generation torque) are calculated. Further, the engine rotation speed Ne1 is higher than the engine rotation speed Ne2.

When the vehicle speeds at the engine rotation speeds Ne1 and Ne2 are expressed as vehicle speeds VSP1 and VSP2, respectively, in a state where the gear is fixed, the vehicle speed VSP1 is higher than the vehicle speed VSP2. For example, the vehicle speed VSP1 is 50 [km/h] and the vehicle speed VSP2 is 10 [km/h].

The difference between the Δ torques when the acceleration of the vehicle is equal to or greater than the predetermined acceleration G is larger in a case of Ne1 which is a higher engine rotation speed (VSP1 which is a higher vehicle speed) (indicated by a square mark in FIG. 10) than in a case of Ne2 which is a lower engine rotation speed (VSP2 which is a lower vehicle speed) (indicated by a triangular mark in FIG. 10). Therefore, when it is assumed that a state where the acceleration of the vehicle is equal to or greater than the predetermined acceleration G is a state where the vehicle is in danger, it is necessary to set a plurality of threshold values (permission determination threshold values) for the permission of the detection of the dangerous state (abnormal state) of the vehicle for each of the engine rotation speeds Ne1 (VSP1) and Ne2 (VSP2). For example, the threshold value shown in FIG. 10 is larger in a case of Ne1 (VSP1) than in a case of Ne2 (VSP2).

The graph (c) of FIG. 10 is a graph showing an example of the relationship between a threshold value (ΔNm) of the difference between the Δ torques, and the vehicle speed VSP (engine rotation speed Ne). The threshold value (ΔNm) of the difference between the Δ torques corresponds to the permission determination threshold value calculated by the permission determination threshold value calculation unit 702 illustrated in FIG. 7. Further, as described with reference to the graphs (a) and (b) of FIG. 10, it can be seen that a plurality of permission determination threshold values that are variable according to the engine rotation speed (Ne) or the vehicle speed (VSP) are set for each time interval (each of Δt1 and Δt2).

Figure 11A:
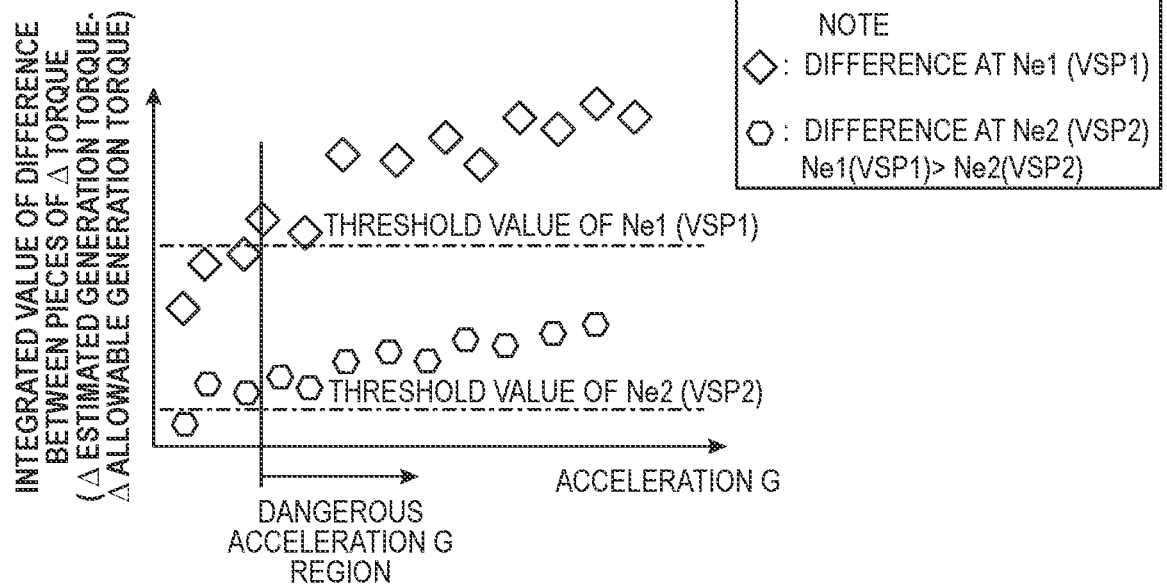
FIGS. 11A and 11B illustrate graphs showing examples of the relationship between the integrated value of the difference between the Δ torques and the acceleration G of the vehicle, and the relationship between the vehicle speed and an abnormality determination time threshold value according to the difference in engine rotation speed according to the first embodiment of the present invention.
Figure 11B:
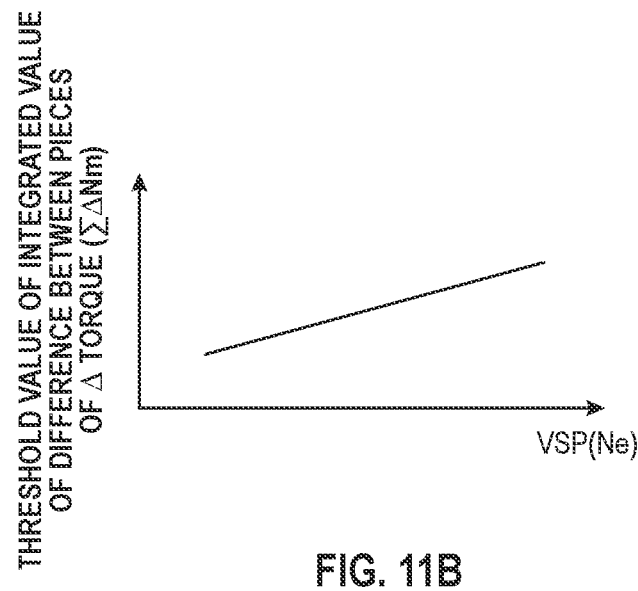

FIG. 11 illustrates graphs showing examples of the relationship between the integrated value of the difference between the Δ torques and the acceleration G of the vehicle, and the relationship between the vehicle speed and the abnormality determination time threshold value according to the difference in engine rotation speed.

The graph (a) in FIG. 11 shows the example of the relationship between the integrated value of the difference between the Δ torques and the acceleration G when the throttle valve 203 is opened stepwise in a state where a gear of a transmission is fixed and a predetermined engine rotation speed is maintained. The graph (a) is illustrated as a result of using two engine rotation speeds (Ne1 and Ne2). As described above, the engine rotation speed Ne1 is higher than the engine rotation speed Ne2. Further, when the vehicle speeds at the engine rotation speeds Ne1 and Ne2 are expressed as vehicle speeds VSP1 and VSP2, respectively, because the gear is fixed, the vehicle speed VSP1 is higher than the vehicle speed VSP2.

The integrated value of the difference between the Δ torques when the acceleration of the vehicle is equal to or greater than the predetermined acceleration G is larger in a case of Ne1 which is a higher engine rotation speed (VSP1 which is a higher vehicle speed) (indicated by a rhombus mark in FIG. 10) than in a case of Ne2 which is a lower engine rotation speed (VSP2 which is a lower vehicle speed) (indicated by a hexagonal mark in FIG. 10). Therefore, when it is assumed that a state where the acceleration of the vehicle is equal to or greater than the predetermined acceleration G is a state where the vehicle is in danger, it is necessary to set a plurality of threshold values (abnormality determination threshold values) for the detection of the dangerous state (abnormal state) of the vehicle for each of Ne1 (VSP1) and Ne2 (VSP2). For example, the threshold value shown in FIG. 10 is larger in a case of Ne1 (VSP1) than in a case of Ne2 (VSP2).

The graph (b) of FIG. 11 is a graph showing an example of the relationship between a threshold value (ΔNm) of the integrated value of the difference between the Δ torques, and the vehicle speed VSP (engine rotation speed Ne). The threshold value (ΔΣNm) of the integrated value of the difference between the Δ torques corresponds to the abnormality determination threshold value calculated by the abnormality determination threshold value calculation unit 709 illustrated in FIG. 7. Further, as described with reference to the graph (a) of FIG. 11, it can be seen that it is necessary to set the abnormality determination threshold value to be variable according to the engine rotation speed (Ne) or the vehicle speed (VSP).

Figure 12A:
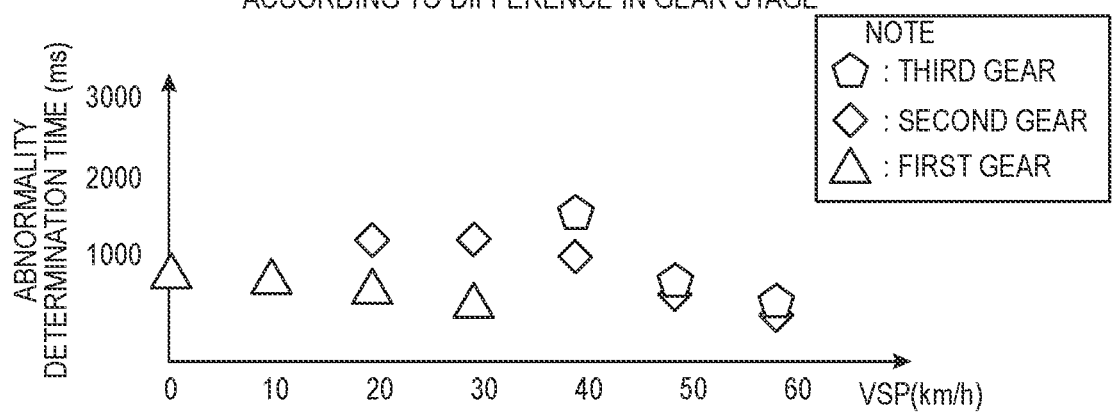
FIGS. 12A-12C illustrate graphs showing an example of the relationship between an abnormality determination time and the vehicle speed at the time of occurrence of an abnormality according to a difference in gear stage according to the first embodiment of the present invention.
Figure 12B:
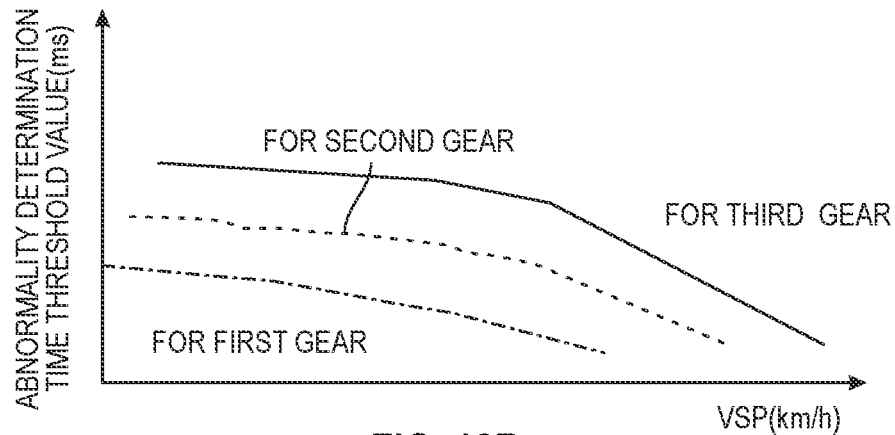
Figure 12C:
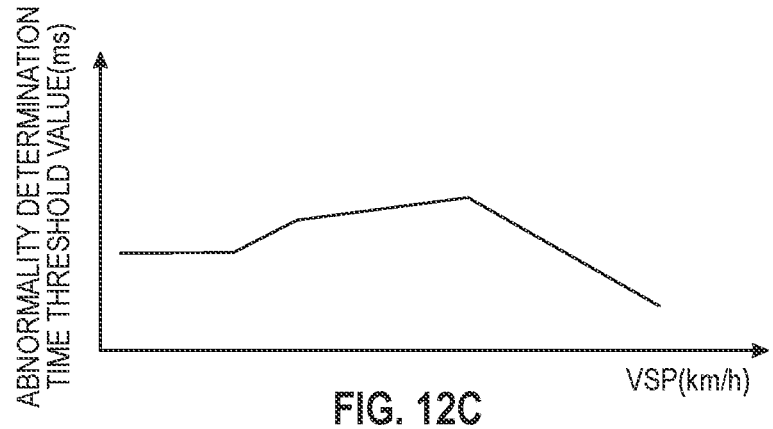

FIG. 12 illustrates graphs showing an example of the relationship between the abnormality determination time and the vehicle speed at the time of occurrence of an abnormality according to a difference in gear stage.

The graph (a) of FIG. 12 shows an example of the relationship between the abnormality determination time [ms] (a time until the integrated value reaches the threshold value) required to calculate the integrated value for detecting the abnormal state illustrated in FIG. 11 and the vehicle speed (VSP) [km/h] when an abnormality occurs at each gear. Therefore, in the graph (a), the abnormality determination times measured when the throttle valve 203 is opened stepwise in a state where the gear of the transmission is changed and a predetermined vehicle speed (engine rotation speed) is maintained are plotted.

For example, in a range of the vehicle speed from 20 km/h to 40 km/h, at the same vehicle speed, a time (abnormality determination time) required to calculate the integrated value for detecting the abnormal state is long on a high gear side (a side on which the engine rotation speed is low). In FIG. 12, the abnormality determination times are plotted for every 10 [km/h] of vehicle speed (VSP), in which a first gear is indicated by a triangular mark, a second gear is indicated by a rhombus mark, and a third gear is indicated by a pentagon mark.

This result is obtained when the vehicle according to the present embodiment is a turbo car. Therefore, the time (abnormality determination time) required to calculate the integrated value for detecting the abnormal state becomes long on the high gear side (the side on which the engine rotation speed is low) due to a lag in turbocharging (turbo lag).

The graph (b) of FIG. 12 shows an example of the relationship between the vehicle speed [km/h] and the abnormality determination time threshold value [ms]. FIG. 12 illustrates a graph showing the relationship between the vehicle speed and the abnormality determination time threshold value for the first gear, the second gear, and the third gear. As shown in the graph (b), it is necessary to set the abnormality determination time threshold value calculated by the abnormality determination time threshold value calculation unit 707 illustrated in FIG. 7 as a variable threshold value according to the vehicle speed (VSP) for each gear stage of the transmission.

Further, the abnormality determination time threshold value can be set by another method.

The graph (c) of FIG. 12 shows another example of the relationship between the vehicle speed [km/h] and the abnormality determination time threshold value [ms]. As shown in the graph (c), it is necessary to set the abnormality determination time threshold value calculated by the abnormality determination time threshold value calculation unit 707 illustrated in FIG. 7 to the maximum time, such that all gear stages can be covered.

Next, an example of the behavior of the in-vehicle control device 217 will be described.

Figure 13:
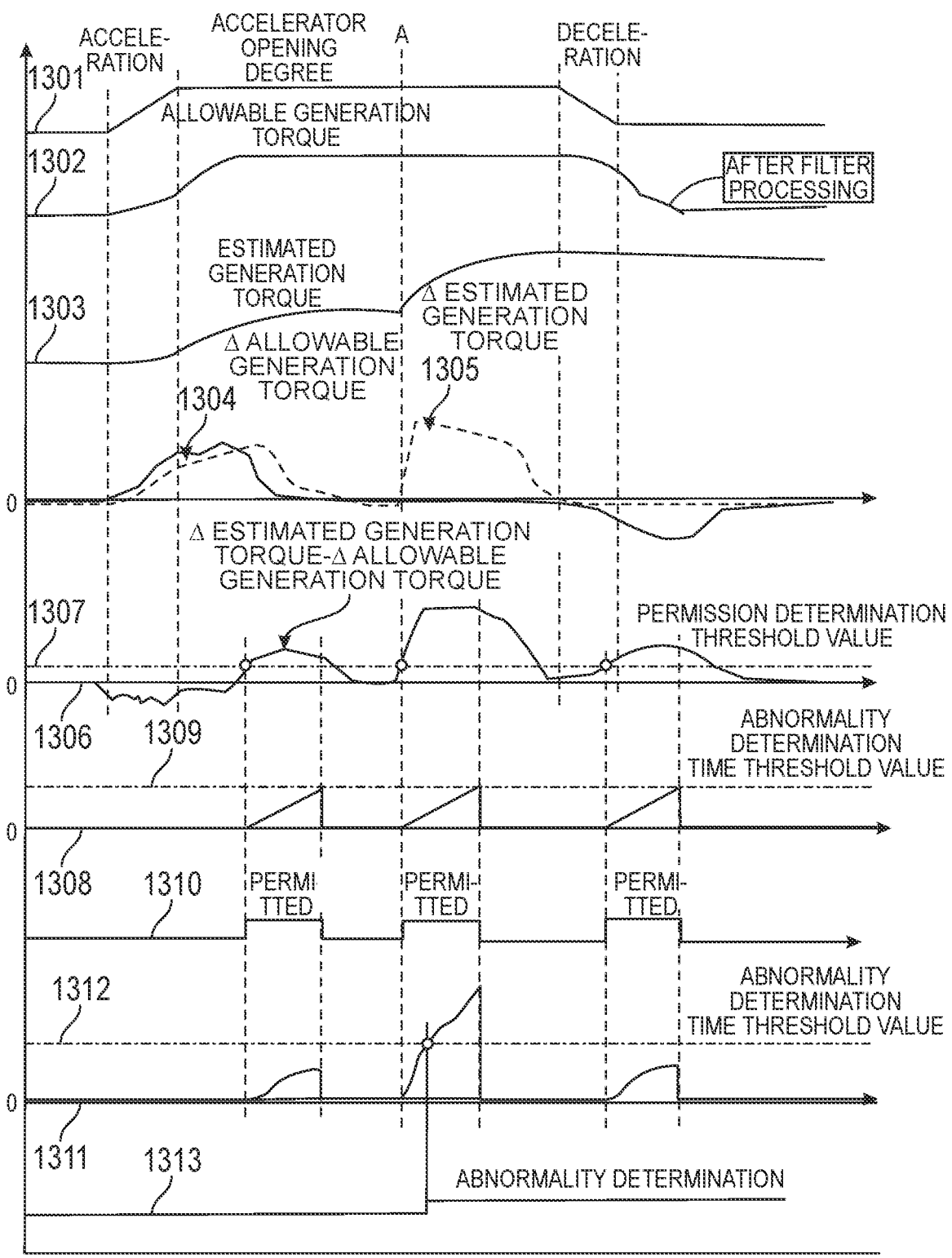
FIG. 13 is a chart illustrating an example of an abnormality detection behavior of the in-vehicle control device according to the first embodiment of the present invention.

FIG. 13 is a chart illustrating an example of an abnormality detection behavior of the in-vehicle control device 217. In this chart, the values calculated by each part of the in-vehicle control device 217 are represented by Lines 1301 to 1313.

Line 1301 represents an accelerator opening degree which indicates the amount of depression of the accelerator of the driver. The accelerator opening degree is a value calculated by the driving operation amount detection unit 101. Line 1301 shows a state where the accelerator opening degree is changed when the vehicle is accelerated, travels at a constant speed, or is decelerated.

Line 1302 represents the allowable generation torque calculated by the allowable generation torque calculation unit 110. It is shown that the allowable generation torque is increased as the accelerator opening degree is increased (acceleration state), and the allowable generation torque is decreased as the accelerator opening degree is decreased (deceleration state). Therefore, Line 1302 shows a state where the allowable generation torque is changed in accordance with the change in accelerator opening degree.

Line 1303 represents the estimated generation torque calculated by the estimated generation torque calculation unit 111. Line 1303 shows that the behavior during the acceleration and deceleration is delayed due to the influence of the response delay of the intake air and the like on the operation for the accelerator opening degree. Note that, in the present embodiment, a situation in which the estimated generation torque is increased from a time point A due to the occurrence of an abnormality is described.

Further, as for the allowable generation torque, the abnormality detection is performed on the basis of the difference between the allowable generation torque and the estimated generation torque. Therefore, in order to improve the detection accuracy and prevent erroneous detection, filter processing in which the phase of the allowable generation torque is matched with that of the estimated generation torque. The fact that the filter processing is performed on the allowable generation torque is indicated by "after filter processing" on Line 1303.

Line 1304 represents the amount of change (Δ allowable generation torque) in allowable generation torque per unit time, calculated by the allowable generation torque change amount calculation unit 510.

Line 1305 represents the amount of change (Δ estimated generation torque) in estimated generation torque per unit time, calculated by the estimated generation torque change amount calculation unit 608.

Line 1306 represents the difference between the Δ estimated generation torque and the Δ allowable generation torque calculated by the difference calculation unit 701.

Line 1307 represents the permission determination threshold value for the abnormality detection permission determination processing unit 704 to determine the abnormality detection permission.

Line 1308 represents the abnormality detection time measured by starting the timer of the abnormality detection time calculation unit 706 when the difference between the Δ estimated generation torque and the Δ allowable generation torque represented by Line 1306 is larger than the permission determination threshold value.

Line 1309 represents the abnormality determination time threshold value for limiting the measurement of the abnormality detection time, the abnormality determination time threshold value being calculated by the abnormality determination time threshold value calculation unit 707. It can be seen that the abnormality detection time represented by Line 1308 is counted until the abnormality determination time threshold value represented by Line 1309 is reached.

Line 1310 represents the setting state of a permission flag of the abnormality detection permission determination processing unit 704. The abnormality detection permission is indicated in a manner in which the permission flag is turned on when Line 1310 is in a high state. The permission flag is turned off when Line 1310 is in a low state.

As shown in Line 1306, since the Δ allowable generation torque is subtracted from the Δ estimated generation torque, the difference in the acceleration state has a negative value. Then, when traveling at a constant speed, the difference becomes larger than the permission determination threshold value. At a timing at which the difference becomes larger than the permission determination threshold value as described above, the timer for measuring the abnormality detection time is activated as shown in Line 1308, and the permission flag shown in Line 1310 is turned on to determine the abnormality detection permission.

Thereafter, when the abnormality detection time represented by Line 1308 reaches the abnormality determination time threshold value represented by Line 1309, the timer is cleared and the abnormality detection time is reset to 0. Further, the permission flag is turned off, and Line 1310 returns to the low state.

The reason why the abnormality determination time threshold value is provided as described above is that it is difficult to completely match the phase of the allowable generation torque after the filter processing with the phase of the estimated generation torque to fix the value of Line 1306 to 0. Since the constant integration leads to the erroneous detection of the abnormal state, the abnormality determination time threshold value is provided in order to improve the accuracy in detection of the abnormal state.

Line 1311 shows a state where the difference between the Δ estimated generation torque and the Δ allowable generation torque represented by Line 1306 is integrated while the permission flag represented by Line 1310 is turned on.

Line 1312 represents the abnormality determination threshold value used by the comparison unit 710 for the abnormality determination.

Line 1313 represents the setting state of an abnormality determination flag of the comparison unit 710. The comparison unit 710 turns on the abnormality determination flag when Line 1313 is in a high state, and outputs the abnormality determination. On the other hand, the comparison unit 710 does not output the abnormality determination because the abnormality determination flag is turned off when Line 1313 is in a low state.

As shown in Line 1311, when the integrated value obtained by integrating the difference between the Δ estimated generation torque and the Δ allowable generation torque is larger than the abnormality determination threshold value represented by Line 1312, the comparison unit 710 illustrated in FIG. 7 outputs the abnormality determination. Then, the comparison unit 710 sets the abnormality determination flag represented by Line 1313 to an abnormality determination state. As described above, the abnormality detection unit (abnormality detection unit 112) outputs the abnormality determination when the integrated value (the integrated value of the difference between the Δ estimated generation torque and the Δ allowable generation torque) is larger than the abnormality determination threshold value while it is determined that the abnormality detection is permitted. As a result, for example, even in a case where the estimated generation torque and the allowable generation torque are out of phase, and the integration of the difference between the Δ estimated generation torque and the Δ allowable generation torque is started, if there is no abnormality, the integrated value does not exceed the abnormality determination threshold value. Therefore, it is possible to eliminate the possibility that the abnormality detection unit 112 erroneously determines that there is an abnormality when the engine 201 is in the normal state.

Next, an example of processing performed in the respective parts of the in-vehicle control device 217 will be described with reference to FIGS. 14 to 17.

Figure 14:
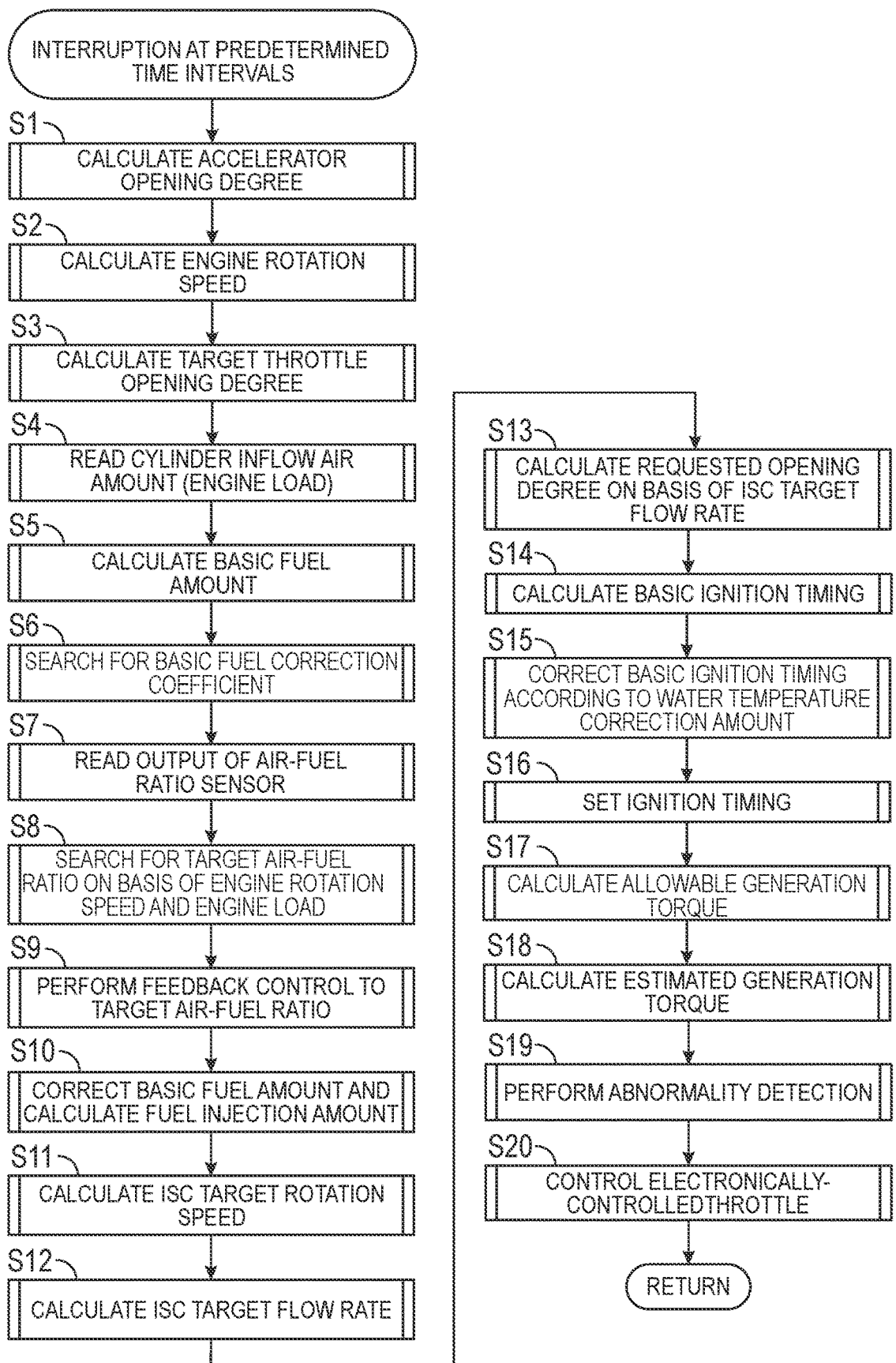
FIG. 14 is a flowchart illustrating an example of a series of processing performed in the respective parts of the in-vehicle control device according to the first embodiment of the present invention.

FIG. 14 is a flowchart illustrating an example of a series of processing performed in the respective parts of the in-vehicle control device 217. Here, each step will be described with reference to each control block constituting the in-vehicle control device 217 illustrated in FIG. 1.

First, the driving operation amount detection unit 101 converts an output voltage from the accelerator opening degree sensor 218 into an accelerator opening degree ratio, and reads the accelerator opening degree ratio (S1). For example, when the accelerator is fully opened, the accelerator opening degree ratio is 100%.

Next, the engine rotation speed calculation unit 102 counts the number of the electric signals input from the crank angle sensor 219 per unit time, mainly the number of pulse signal changes per unit time, and performs the computation processing to calculate the engine rotation speed (S2).

Next, the target throttle opening degree calculation unit 406 calculates and reads the target throttle opening degree on the basis of the target torque calculated by the target torque calculation unit 405 (S3). In addition, the throttle opening degree calculation unit 408 converts a throttle opening degree sensor output voltage from the throttle opening degree sensor 215 into the throttle opening degree and reads the throttle opening degree.

Next, the cylinder inflow air amount calculation unit 103 reads the cylinder inflow air amount (engine load) converted on the basis of the output voltage of the intake air amount sensor (thermal air flow meter) 202 (S4). Next, the basic fuel amount calculation unit 104 calculates the basic fuel amount on the basis of the engine rotation speed and the cylinder inflow air amount (engine load) (S5).

Next, the fuel correction unit 113 searches a map for the basic fuel correction coefficient on the basis of the engine rotation speed and the engine load to calculate the basic fuel correction coefficient (S6). Next, the air-fuel ratio correction coefficient calculation unit 107 reads the actual air-fuel ratio converted from an output voltage of the air-fuel ratio sensor 211 (S7). Next, the target air-fuel ratio calculation unit 108 searches a map for the target air-fuel ratio on the basis of the engine rotation speed and the engine load to search for the target air-fuel ratio (S8). Next, the air-fuel ratio correction coefficient calculation unit 107 performs a feedback control to the target air-fuel ratio by using the target air-fuel ratio and the actual air-fuel ratio, and calculates the air-fuel ratio correction coefficient (S9).

Next, the fuel correction unit 113 corrects the basic fuel amount by using the basic fuel correction coefficient and the air-fuel ratio correction coefficient obtained by performing the feedback control, and calculates the fuel injection amount (S10) Next, the ISC control unit 106 calculates the target value of the idle rotation speed (ISC target speed) (S11), and calculates the ISC target flow rate that can realize the target value of the idle rotation speed (S12). Then, the ISC control unit 106 calculates a required opening degree on the basis of the ISC target flow rate (S13).

Next, the basic ignition timing calculation unit 105 calculates the basic ignition timing of the engine 201 on the basis of the engine rotation speed and the engine load (S14). Next, the ignition timing correction unit 114 performs the correction of the water temperature or the like at the basic ignition timing according to a water temperature correction amount (S15), and sets the corrected ignition timing in the 1-cylinder fuel injection unit 116 to the 4-cylinder fuel injection unit 119 (S16).

Next, the allowable generation torque calculation unit 110 calculates the allowable generation torque (S17). Next, the estimated generation torque calculation unit 111 calculates the estimated generation torque (S18). Next, the abnormality detection unit 112 detects the abnormality of the engine 201 on the basis of the allowable generation torque and the estimated generation torque (S19).

Next, the electronically-controlled throttle control unit 115 controls the throttle valve 203 to be opened to a final throttle opening degree on the basis of a required opening degree based on the target torque, calculated by the target throttle opening degree calculation unit 109 on the basis of the accelerator opening degree and the engine rotation speed, and the required opening degree calculated by the ISC control unit 106 on the basis of the ISC target flow rate (S20). Note that even when the abnormality of the engine 201 is detected in Step S19, the electronically-controlled throttle control unit 115 controls the throttle opening degree of the throttle valve 203 (S20).

Next, an example of the abnormality detection processing according to the present embodiment will be described with reference to FIGS. 15 to 17. The abnormality detection processing is interrupt processing performed at predetermined time intervals.

Figure 15:
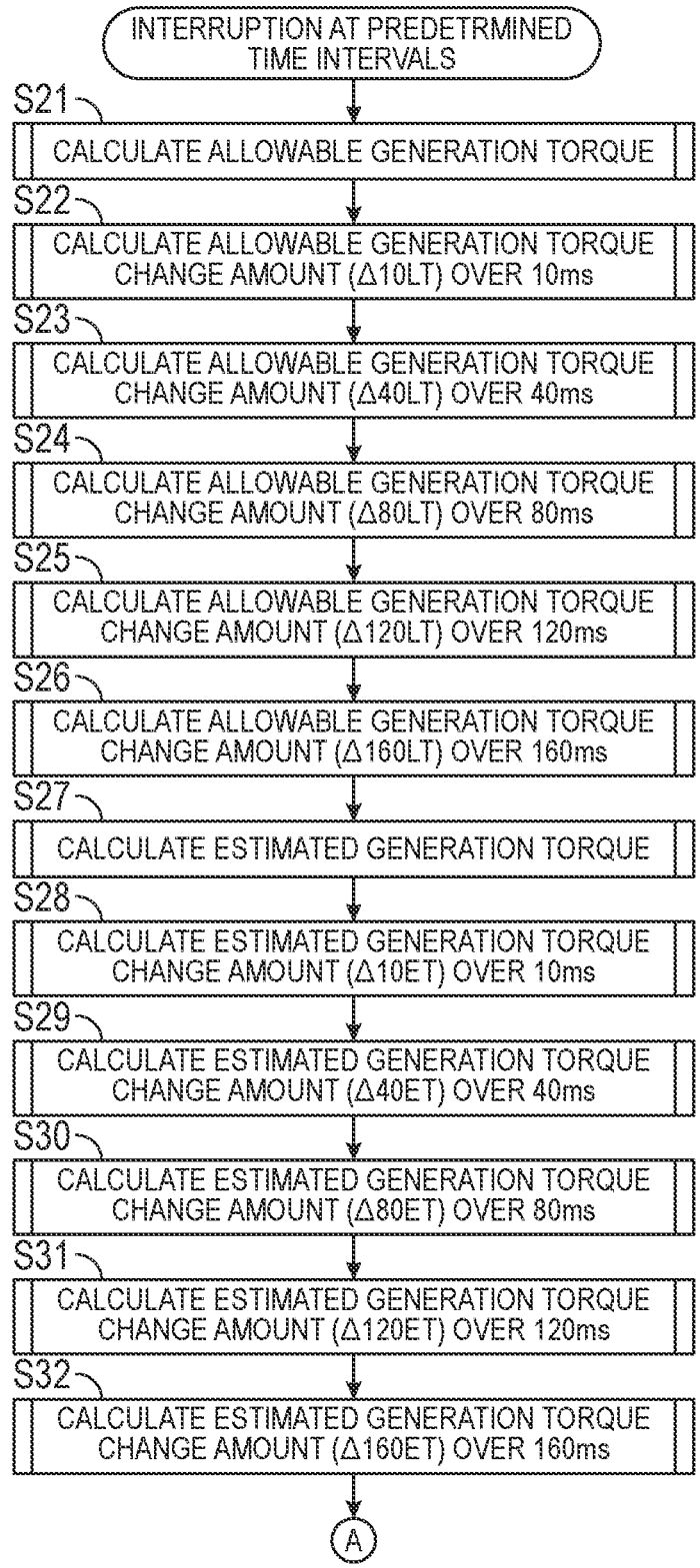
FIG. 15 is a flowchart illustrating a detailed example of processing of calculating allowable generation torque in Step S17 of FIG. 14 and processing of calculating estimated generation torque in Step S18.

FIG. 15 is a flowchart illustrating a detailed example of processing of calculating the allowable generation torque in Step S17 of FIG. 14 and processing of calculating the estimated generation torque in Step S18.

First, the allowable generation torque calculation unit 110 calculates the allowable generation torque (S21). Next, the allowable generation torque change amount calculation unit (allowable generation torque calculation unit 110) calculates a plurality of different allowable generation torque change amounts per unit time with the same starting point. For example, the allowable generation torque calculation unit 110 sequentially calculates the allowable generation torque change amounts (Δ10LT, Δ40LT, Δ80LT, Δ120LT, and Δ160LT) over 10 ms, 40 ms, 80 ms, 120 ms, and 160 ms with the same starting point (S22 to S26). Starting points from which the allowable generation torque change amounts are calculated are the same as each other. For example, 10 ms in Step S22, 40 ms in Step S23, and the like both represent elapsed times from the same starting point of 0.

Next, the estimated generation torque calculation unit 111 calculates the estimated generation torque (S27). Next, the estimated generation torque change amount calculation unit (estimated generation torque calculation unit 111) calculates a plurality of different estimated generation torque change amounts per unit time with the same starting point. For example, the estimated generation torque calculation unit 111 sequentially calculates the estimated generation torque change amounts (Δ10ET, Δ40ET, Δ80ET, Δ120ET, and Δ160ET) over 10 mS, 40 ms, 80 ms, 120 ms, and 160 ms with the same starting point (S28 to S32). Even in this case, starting points at which the estimated generation torque change amounts are calculated are the same as each other. After Step S32, the processing proceeds to Step S41 in FIG. 16 which is connected by a connector A.

Figure 16:
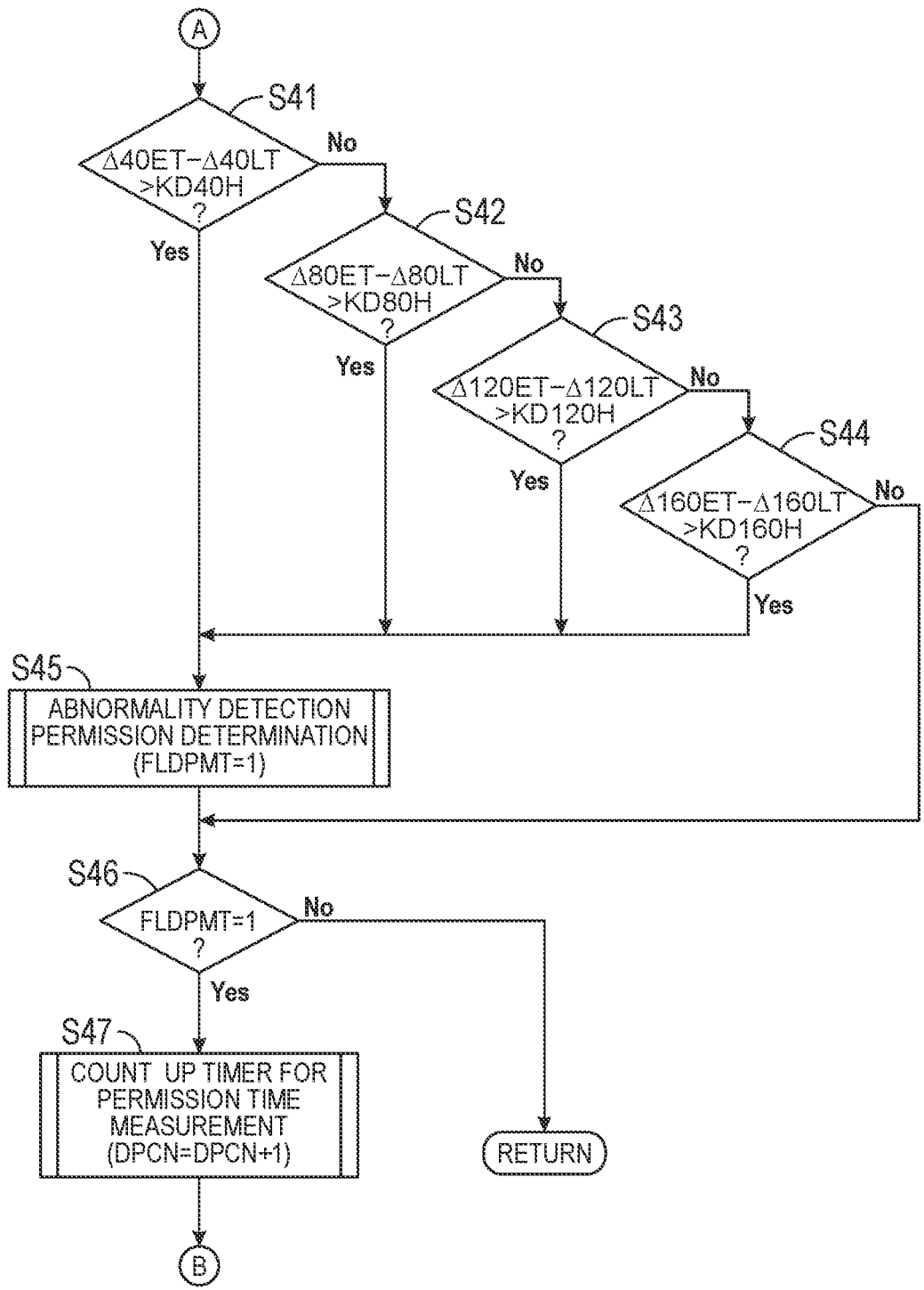
FIG. 16 is a flowchart illustrating an example of an abnormality detection permission determination processing performed by the abnormality detection unit according to the first embodiment of the present invention.
Figure 17:
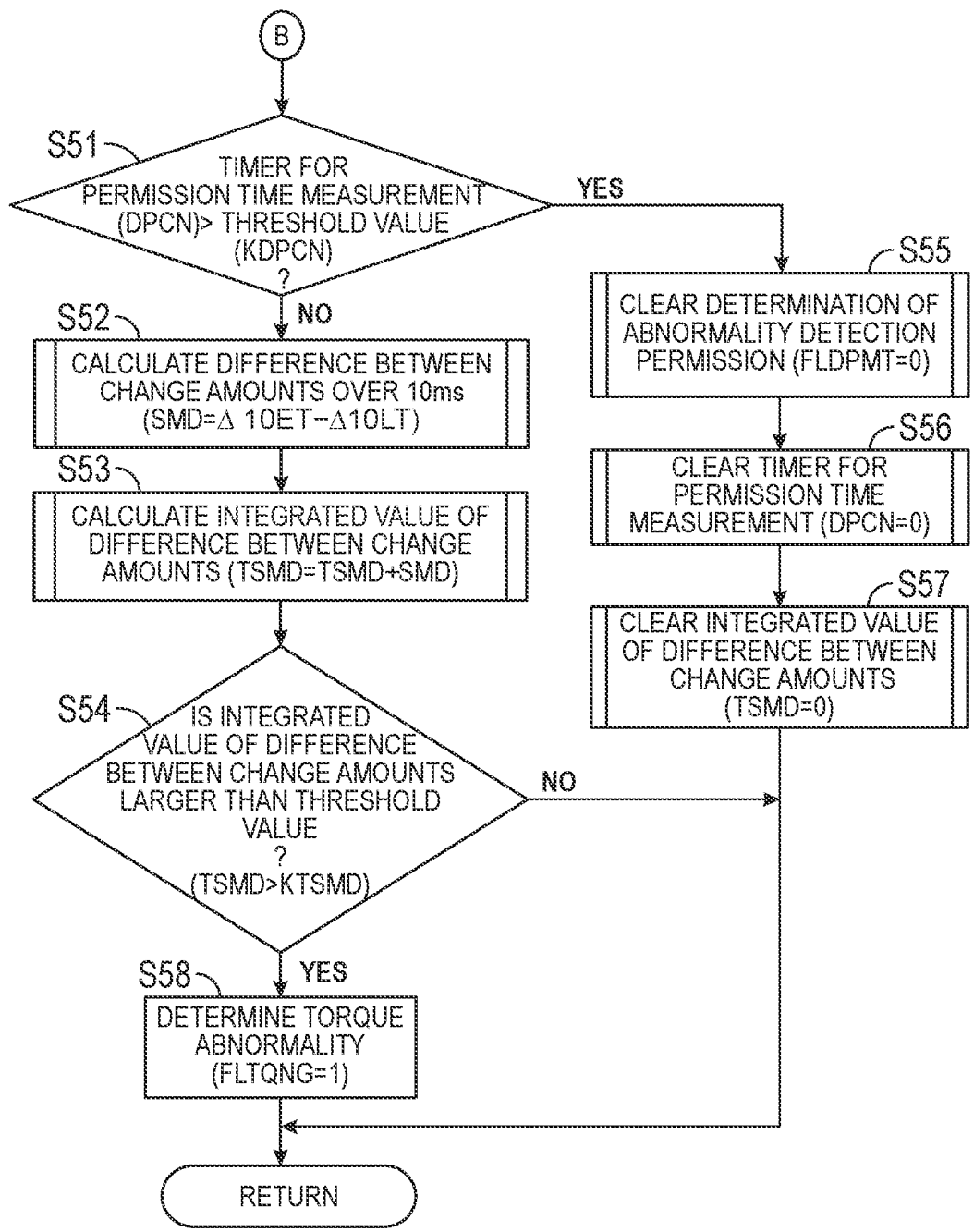
FIG. 17 is a flowchart illustrating an example of an abnormality determination processing performed by the abnormality detection unit according to the first embodiment of the present invention.

FIGS. 16 and 17 are flowcharts each illustrating a detailed example of the abnormality detection processing performed in Step S19 in FIG. 14. Here, the abnormality detection unit 112 performs the processing of each step.

FIG. 16 is a flowchart illustrating an example of the abnormality detection permission determination processing performed by the abnormality detection unit 112.

Here, the abnormality detection unit (abnormality detection unit 112) determines that the abnormality detection is permitted when the difference between the estimated generation torque change amount and the allowable generation torque change amount calculated for each same unit time is larger than the permission determination threshold value.

First, the abnormality detection unit 112 checks whether or not the difference between the estimated generation torque change amount (Δ40ET) and the allowable generation torque change amount (Δ40LT) over 40 ms is larger than the permission determination threshold value (KD40H) (S41). In a case where the check result in Step S41 is Yes, the abnormality detection unit 112 determines that the abnormality detection is permitted (FLDPMT=1) (S45).

In a case where the check result in Step S41 is No, the abnormality detection unit 112 checks whether or not the difference between the estimated generation torque change amount (Δ80ET) and the allowable generation torque change amount (Δ80LT) over 80 ms is larger than the permission determination threshold value (KD80H) (S42).

In a case where the check result in Step S42 is Yes, the abnormality detection unit 112 determines that the abnormality detection is permitted (FLDPMT=1) (S45) In a case where the check result in Step S42 is No, the abnormality detection unit 112 checks whether or not the difference between the estimated generation torque change amount (Δ120ET) and the allowable generation torque change amount (Δ120LT) over 120 ms is larger than the permission determination threshold value (KD120H) (S43).

In a case where the check result in Step S43 is Yes, the abnormality detection unit 112 determines that the abnormality detection is permitted (FLDPMT=1) (S45) In a case where the check result in Step S43 is No, the abnormality detection unit 112 checks whether or not the difference between the estimated generation torque change amount (Δ160ET) and the allowable generation torque change amount (Δ160LT) over 160 ms is larger than the permission determination threshold value (KD160H) (S44).

In a case where the check result in Step S44 is Yes, the abnormality detection unit 112 determines that the abnormality detection is permitted (FLDPMT=1) (S45) In a case where the check result in Step S44 is No, or after the processing in Step S45, the abnormality detection unit 112 checks whether or not it is determined that the abnormality detection is permitted, that is, whether or not FLDPMT=1 (S46).

In a case where the check result in Step S46 is Yes, the abnormality detection unit 112 counts up the timer for measuring the abnormality detection time (DPCN) (S47), and the processing proceeds to Step S51 in FIG. 17 connected by a connector B. In a case where the check result in Step S46 is No, the abnormality detection unit 112 terminates the flow.

FIG. 17 is a flowchart illustrating a detailed example of the abnormality determination processing performed by the abnormality detection unit 112.

First, the abnormality detection unit 112 checks whether or not the abnormality detection time measured by the timer for measuring the abnormality detection time (DPCN) is greater than the abnormality determination time threshold value (KDPCN) (S51) That is, the abnormality detection unit 112 checks whether or not a time elapsed from when the abnormality detection is permitted exceeds the abnormality determination time threshold value. In a case where the check result in Step S51 is No, the abnormality detection unit 112 calculates the difference (change amount difference: SMD) between the estimated generation torque change amount (Δ10ET) and the allowable generation torque change amount (Δ10LT) over 10 ms (S52).

Thereafter, the abnormality detection unit 112 calculates the integrated value (TSMD) of the change amount difference (SMD) (S53). Next, the abnormality detection unit 112 checks whether or not the integrated value (TSMD) is larger than the abnormality determination threshold value (KTSMD) (S54). In a case where the check result in Step S54 is Yes, the abnormality detection unit 112 determines the torque abnormality of the engine 201 (FLTQNG=1) (S58), and outputs the abnormality determination. In a case where the check result in Step S54 is No, the abnormality detection unit 112 terminates the flow.

On the other hand, in a case where the check result in Step S51 is Yes, the abnormality detection unit 112 clears the determination of the abnormality detection permission (FLDPMT=0) (S55). Thereafter, the abnormality detection unit 112 clears the timer (DPCN) for measuring the abnormality detection time (S56), clears the integrated value (TSMD) of the change amount difference (S57), and terminates the flow.

In the in-vehicle control device 217 according to the first embodiment described above, it is possible to determine the occurrence of the torque abnormality of the engine 201 such as the generation of the excessive torque of the engine 201, on the basis of the integrated value of the difference between the allowable generation torque change amount and the estimated generation torque change amount. Further, in the in-vehicle control device 217, it is also possible to determine the occurrence of the torque abnormality of the engine 201 such as the generation of the excessive torque of the engine 201, on the basis of the integrated value of the difference between the requested torque change amount and the estimated generation torque change amount. Therefore, the abnormality detection unit 112 can determine the torque abnormality in which the torque generated by the engine 201 becomes larger than that intended by the driver due to, for example, the abnormality of the throttle valve 203.

As such, since the torque increase abnormality of the engine 201 is determined on the basis of the driving operation change amount and the operation state change amount of the engine 201, the influence of variation in driving operation amount (a sensor for detecting the operating amount, and the like) and variation in operation state (a sensor for detecting the operation state, and the like) can be suppressed. In addition, since the torque increase abnormality of the engine 201 is determined according to the change amount over a predetermined time (for example, 40 ms to 160 ms), the acceleration unintended by the driver can be suppressed, thereby allowing the driver to avoid danger.

Second Embodiment

In the in-vehicle control device according to the first embodiment described above, the abnormality is detected on the basis of the allowable generation torque calculated from the accelerator opening degree of the driver and the estimated generation torque calculated on the basis of the engine rotation speed and the engine load, that is, the abnormality detection is performed by using a torque. However, the in-vehicle control device may also be configured to perform the abnormality detection by using others, such as a horsepower. Therefore, in an in-vehicle control device according to a second embodiment, instead of the torque, the horsepower can be calculated to determine a horsepower increase abnormality of the engine 201 on the basis of the integrated value of a difference between an allowable generation horsepower change amount and an estimated generation horsepower change amount. Here, an example of configurations of functional blocks for calculating the allowable generation horsepower change amount and the estimated generation horsepower change amount will be described with reference to FIGS. 18 to 20.

Figure 18:
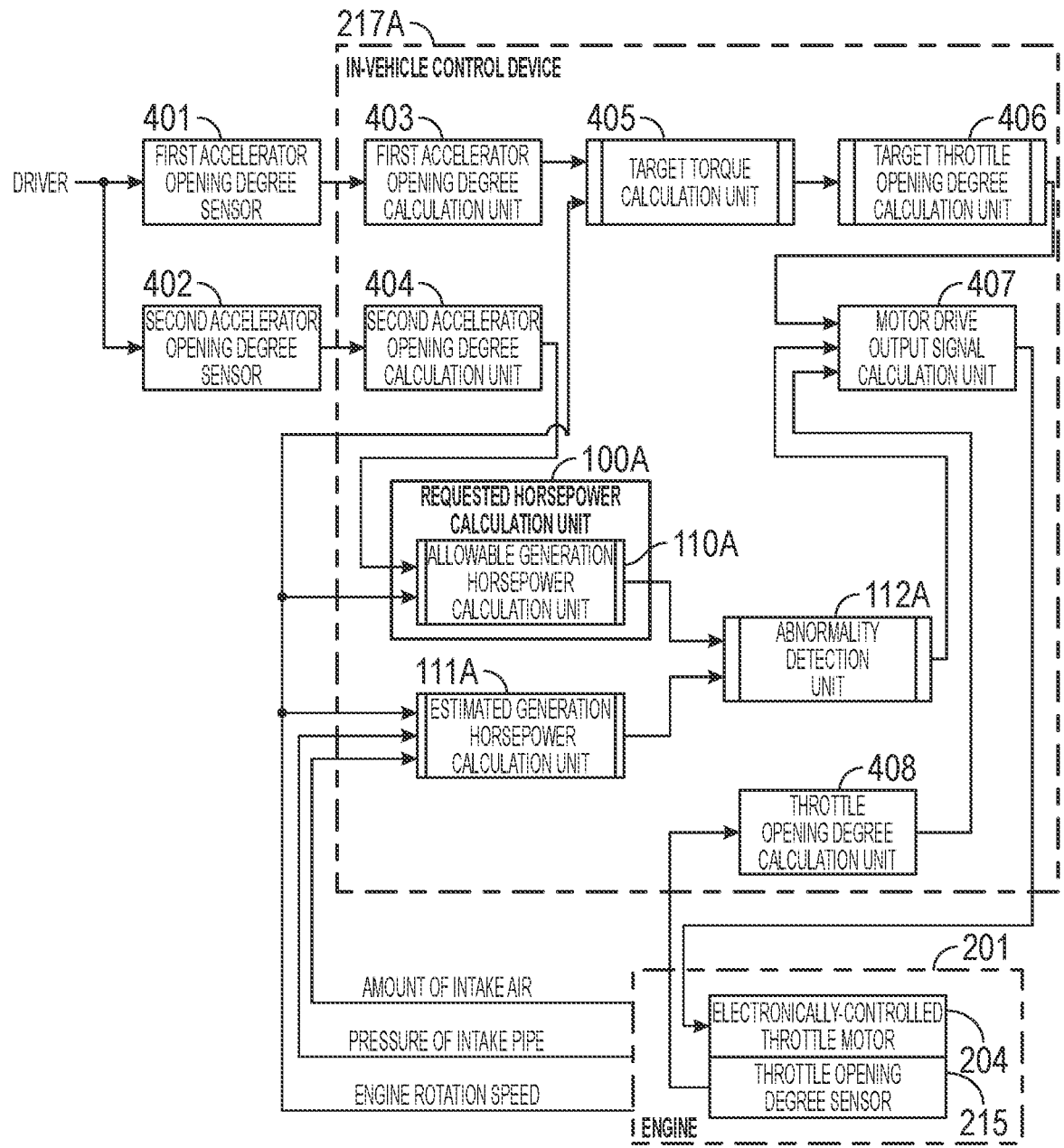
FIG. 18 is a control block diagram illustrating an example of an internal configuration of an in-vehicle control device according to a second embodiment of the present invention.

FIG. 18 is a control block diagram illustrating an example of an internal configuration of an in-vehicle control device 217A according to the second embodiment.

The in-vehicle control device 217A has a configuration in which the requested torque calculation unit 100, the allowable generation torque calculation unit 110, the estimated generation torque calculation unit 111, and the abnormality detection unit 112 of the in-vehicle control device 217 illustrated in FIG. 4 are replaced with a requested horsepower calculation unit 100A, an allowable generation horsepower calculation unit 110A, an estimated generation horsepower calculation unit 111A, and an abnormality detection unit 112A, respectively.

In a case where a requested horsepower is used for processing, a requested horsepower calculation unit (requested horsepower calculation unit 100A) calculates the requested horsepower on the basis of the driving state of the vehicle.

Further, in a case where the allowable generation horsepower is used for processing, the requested horsepower calculation unit (requested horsepower calculation unit 100A) is the allowable generation horsepower calculation unit (allowable generation horsepower calculation unit 110A) which calculates the allowable generation horsepower that can be generated by the drive source (engine 201).

An estimated generation horsepower calculation unit (estimated generation horsepower calculation unit 111A) calculates an estimated generation horsepower estimated as being generated by the drive source (engine 201) of the vehicle.

Then, the abnormality detection unit 112A detects an abnormality of the drive source (engine 201). The abnormality detection unit 112A according to the second embodiment is used to calculate, by using a horsepower, various pieces of processing calculated by using a torque in the first embodiment.

Here, in a case where the horsepower torque is used for processing, the abnormality detection unit (abnormality detection unit 112A) detects the abnormality of the drive source (engine 201) on the basis of the integrated value of a difference between a requested horsepower change amount and the estimated generation horsepower change amount, and outputs the abnormality determination for the drive source (engine 201).

Further, in a case where the allowable generation horsepower is used for processing, the abnormality detection unit (abnormality detection unit 112A) detects the abnormality of the drive source (engine 201) on the basis of a result of comparing the integrated value of the difference between the allowable generation horsepower change amount and the estimated generation horsepower change amount with a threshold value determined from the operation state of the drive source (engine 201).

Figure 19:
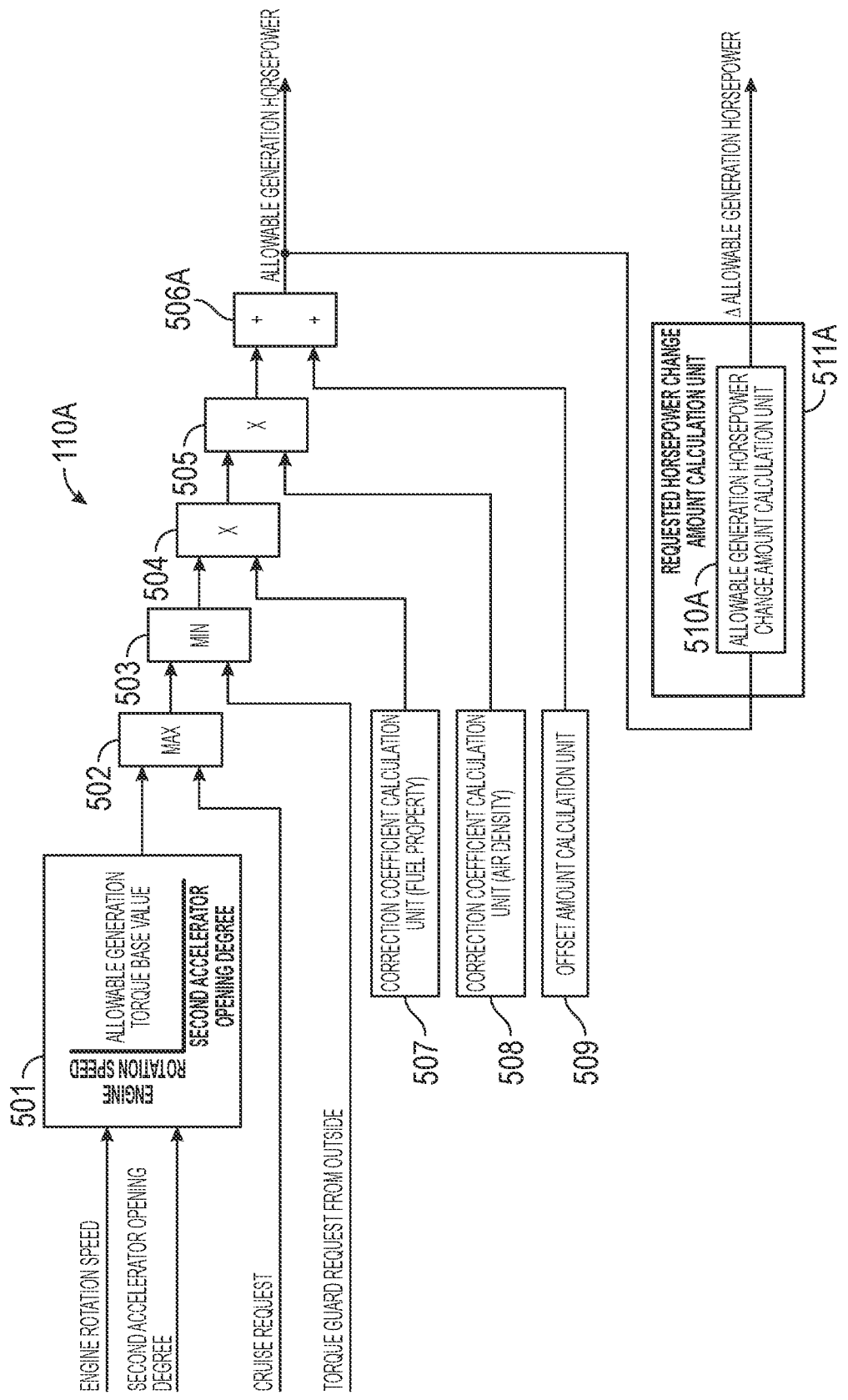
FIG. 19 is a block diagram illustrating an example of a schematic configuration of an allowable generation horsepower calculation unit according to the second embodiment of the present invention.

FIG. 19 is a block diagram illustrating an example of a schematic configuration of the allowable generation horsepower calculation unit 110A.

The allowable generation horsepower calculation unit 110A has a configuration in which the offset amount adding unit 506 and the allowable generation torque change amount calculation unit 510 of the allowable generation torque calculation unit 110 illustrated in FIG. 5 are replaced with an offset amount adding unit 506A and an allowable generation horsepower change amount calculation unit 510A, respectively.

The offset amount adding unit 506A adds an offset amount calculated by the offset amount calculation unit 509 to the allowable generation horsepower converted from the allowable generation torque calculated by the integration unit 505. The offset amount is added to the allowable generation horsepower to thereby prevent the estimated generation horsepower from exceeding the allowable generation horsepower in a normal state, in consideration of a calculation error of the estimated generation horsepower.

The allowable generation horsepower change amount calculation unit 510A calculates the allowable generation horsepower change amount over a predetermined time. The allowable generation horsepower calculated by the allowable generation horsepower change amount calculation unit 510A and the allowable generation horsepower change amount over a predetermined time (Δ allowable generation horsepower) are used by the abnormality detection unit 112A.

Here, in a case where the allowable generation horsepower is used for processing, a requested horsepower change amount calculation unit (requested horsepower change amount calculation unit 511A) is the allowable generation horsepower change amount calculation unit (allowable generation horsepower change amount calculation unit 510A) which calculates the amount of change in allowable generation horsepower per unit time as the allowable generation horsepower change amount. Note that, in a case where the requested horsepower is used for processing, the requested horsepower change amount calculation unit (requested horsepower change amount calculation unit 511A) calculates the amount of change in requested horsepower per unit time as the requested horsepower change amount.

Figure 20:
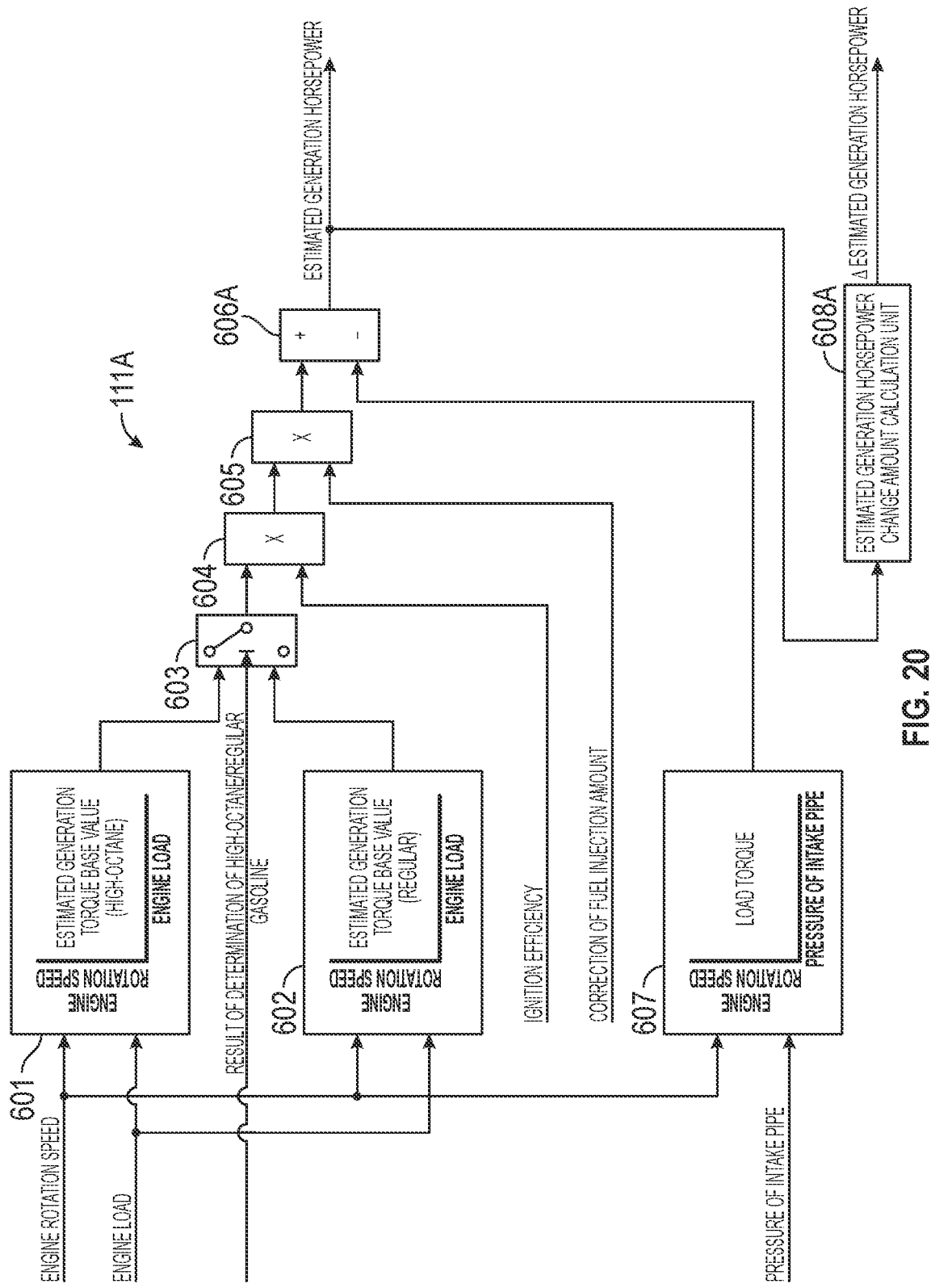
FIG. 20 is a block diagram illustrating an example of a schematic configuration of an estimated generation horsepower calculation unit according to the second embodiment of the present invention.

FIG. 20 is a block diagram illustrating an example of a schematic configuration of the estimated generation horsepower calculation unit 111A.

The estimated generation horsepower calculation unit 111A has a configuration in which the subtracting unit 606 and the estimated generation torque change amount calculation unit 608 of the estimated generation torque calculation unit 111 illustrated in FIG. 6 are replaced with a subtracting unit 606A and an estimated generation horsepower change amount calculation unit 608A, respectively.

The subtracting unit 606A converts the estimated generation torque obtained by subtracting the load torque from the estimated generation torque calculated by the integration unit 605 into the estimated generation horsepower, thereby calculating the estimated generation horsepower as a shaft horsepower of the engine 201.

The estimated generation horsepower change amount calculation unit (estimated generation horsepower change amount calculation unit 608A) calculates the amount of change in estimated generation horsepower per unit time as the estimated generation horsepower change amount. Therefore, the estimated generation horsepower change amount calculation unit 608A calculates the estimated generation horsepower change amount over a predetermined time calculated by the subtracting unit 606A. The estimated generation horsepower calculated by the estimated generation horsepower change amount calculation unit 608A and the estimated generation horsepower change amount over a predetermined time (Δ estimated generation horsepower) are used in abnormality detection processing performed by the abnormality detection unit 112A.

In the in-vehicle control device 217A according to the second embodiment described above, once the abnormality detection unit 112A detects the abnormality of the engine 201 by appropriately using the allowable generation horsepower, the allowable generation horsepower change amount over a predetermined time, the estimated generation horsepower, and the estimated generation horsepower change amount over a predetermined time, the abnormality determination is output. Therefore, in the in-vehicle control device 217A, it is possible to determine the occurrence of the horsepower abnormality of the engine 201 such as the generation of the excessive horsepower of the engine 201, on the basis of the integrated value of the difference between the allowable generation horsepower change amount and the estimated generation horsepower change amount. Further, in the in-vehicle control device 217, it is also possible to determine the occurrence of the horsepower abnormality of the engine 201 such as the generation of the excessive horsepower of the engine 201, on the basis of the integrated value of the difference between the requested horsepower change amount and the estimated generation horsepower change amount.

Modified Example

Note that in each of the above-described embodiments, a case where the vehicle is a turbo car has been described. However, it is also possible to apply the control according to the present embodiment to a vehicle that is not a turbo car.

Further, the drive source is not limited to the engine 201, which is an example of an internal combustion engine, and may be an electric motor. Therefore, the abnormality detection control according to the present embodiment may also be applied to an electric vehicle including an electric motor or a hybrid vehicle including both an electric motor and an internal combustion engine.

The present invention is not limited to the above-described embodiments, and it is a matter of course that various other application examples and modified examples are possible as long as the gist of the present invention described in the claims is not impaired.

For example, the configuration of the system has been described in detail in the above-described embodiments in order to describe the present invention in an easy-to-understand manner, and the present invention is not necessarily limited to those having all the described configurations. In addition, a part of the configuration of the present embodiment can be added with another configuration, can be deleted, and can be replaced with another configuration.

In addition, the control lines and information lines indicate those that are considered necessary for explanation, and do not necessarily indicate all the control lines and information lines in the product. In practice, it can be considered that almost all configurations are interconnected.

REFERENCE SIGNS LIST 100 requested torque calculation unit
101 driving operation amount detection unit
102 engine rotation speed calculation unit
103 cylinder inflow air amount calculation unit
109 target throttle opening degree calculation unit
110 allowable generation torque calculation unit 111 estimated generation torque calculation unit
112 abnormality detection unit
115 electronically-controlled throttle control unit
201 engine
203 throttle valve
217 in-vehicle control device

The invention claimed is:

1. A control device comprising:
a requested torque calculation unit which calculates requested torque on a basis of a driving state of a vehicle;
a requested torque change amount calculation unit which calculates an amount of change in requested torque per unit time as a requested torque change amount;
an estimated generation torque calculation unit which calculates an estimated generation torque estimated as being generated by a drive source of the vehicle;
an estimated generation torque change amount calculation unit which calculates an amount of change in estimated generation torque per unit time as an estimated generation torque change amount; and
an abnormality detection unit which detects an abnormality of the drive source on a basis of an integrated value of a difference between the requested torque change amount and the estimated generation torque change amount, and outputs abnormality determination for the drive source, wherein
the requested torque calculation unit is an allowable generation torque calculation unit which calculates allowable generation torque that is generatable by the drive source,
the requested torque change amount calculation unit is an allowable generation torque change amount calculation unit which calculates an amount of change in allowable generation torque per unit time as an allowable generation torque change amount,
the abnormality detection unit detects the abnormality of the drive source on a basis of a result of comparing an integrated value of a difference between the allowable generation torque change amount and the estimated generation torque change amount with a threshold value determined from an operation state of the drive source,
the abnormality detection unit determines that abnormality detection is permitted in a case where the difference between the allowable generation torque change amount and the estimated generation torque change amount is larger than a permission determination threshold value, calculates, as an abnormality detection time, a time in which it is determined that the abnormality detection is permitted, and continues the calculation of the abnormality detection time until the abnormality detection time reaches an abnormality determination time threshold value,
the abnormality detection unit calculates the integrated value while the abnormality detection is permitted, detects the abnormality of the drive source when the integrated value is larger than an abnormality determination threshold value determined on a basis of the operation state of the drive source, and outputs the abnormality determination,
the allowable generation torque change amount calculation unit calculates a plurality of different allowable generation torque change amounts per unit time with the same starting point,
the estimated generation torque change amount calculation unit calculates a plurality of different estimated generation torque change amounts per unit time with the same starting point, and
the abnormality detection unit determines that the abnormality detection is permitted when a difference between the allowable generation torque change amount and the estimated generation torque change amount calculated for each same unit time is larger than the permission determination threshold value.

2. The control device according to claim 1, wherein
the permission determination threshold value is used by the abnormality detection unit to determine permission of the abnormality detection for the drive source, and varies depending on a vehicle speed of the vehicle and a predetermined time,
the abnormality determination time threshold value is used to limit a time in which the difference between the allowable generation torque change amount and the estimated generation torque change amount is integrated, and
the abnormality determination threshold value is used by the abnormality detection unit to detect the abnormality of the drive source on a basis of the integrated value, and varies depending on the vehicle speed.

3. The control device according to claim 1, wherein the integrated value is near zero when the drive source is in a normal state, and the integrated value becomes larger than the abnormality determination threshold value when the drive source is in an abnormal state.

4. The control device according to claim 1, wherein the abnormality detection unit compares a difference abnormality detection time calculated when a difference between the estimated generation torque and the allowable generation torque is larger than a difference abnormality determination threshold value while the abnormality detection is permitted, with a difference abnormality determination time threshold value, and determines that the difference is abnormal when the difference abnormality detection time is greater than the difference abnormality determination time threshold value.

5. The control device according to claim 4, wherein the abnormality detection unit outputs the abnormality determination considering a state of the difference between the estimated generation torque and the allowable generation torque on a basis of a determined difference abnormality and the abnormality determination output on a basis of the integrated value.

6. The control device according to claim 1, wherein the abnormality detection unit outputs the abnormality determination when a provisional abnormality determination time which is a period, in which it is determined that there is a provisional abnormality in a case where the integrated value is larger than a provisional abnormality determination threshold value, is greater than a provisional abnormality determination time threshold value, and the integrated value is larger than an abnormality determination integrated value threshold value.

7. The control device according to claim 1, further comprising:
a target torque calculation unit which calculates target torque on a basis of an accelerator opening degree and a rotation speed of the drive source;
a target throttle opening degree calculation unit which calculates a target throttle opening degree on a basis of the target torque;
a motor drive output signal calculation unit which calculates a motor drive output signal for driving a throttle motor that opens a throttle valve at the target throttle opening degree; and a throttle opening degree calculation unit which calculates a throttle opening degree on a basis of a sensor signal input from a throttle opening degree sensor that detects the throttle opening degree of the throttle valve, wherein the motor drive output signal calculation unit performs a feedback control for the motor drive output signal so that the throttle opening degree reaches the target throttle opening degree on a basis of the target throttle opening degree, the abnormality determination, and the throttle opening degree.

8. The control device according to claim 7, wherein the motor drive output signal calculation unit performs fail-safe processing for reducing torque generated by the drive source when the abnormality determination is input.

9. A control device comprising:
a requested horsepower calculation unit which calculates a requested horsepower on a basis of a driving state of a vehicle;
a requested horsepower change amount calculation unit which calculates an amount of change in requested horsepower per unit time as a requested horsepower change amount;
an estimated generation horsepower calculation unit which calculates an estimated generation horsepower estimated as being generated by a drive source of the vehicle;
an estimated generation horsepower change amount calculation unit which calculates an amount of change in estimated generation horsepower per unit time as an estimated generation horsepower change amount; and
an abnormality detection unit which detects an abnormality of the drive source on a basis of an integrated value of a difference between the requested horsepower change amount and the estimated generation horsepower change amount, and outputs abnormality determination for the drive source, wherein
the requested horsepower calculation unit is an allowable generation horsepower calculation unit which calculates an allowable generation horsepower that is generatable by the drive source,
the requested horsepower change amount calculation unit is an allowable generation horsepower change amount calculation unit which calculates an amount of change in allowable generation horsepower per unit time as an allowable generation horsepower change amount,
the abnormality detection unit detects the abnormality of the drive source on a basis of a result of comparing an integrated value of a difference between the allowable generation horsepower change amount and the estimated generation horsepower change amount with a threshold value determined from an operation state of the drive source,
the abnormality detection unit determines that abnormality detection is permitted in a case where the difference between the allowable generation horsepower change amount and the estimated generation horsepower change amount is larger than a permission determination threshold value, calculates, as an abnormality detection time, a time in which it is determined that the abnormality detection is permitted, and continues the calculation of the abnormality detection time until the abnormality detection time reaches an abnormality determination time threshold value, and
the abnormality detection unit compares a difference abnormality detection time calculated when a difference between the estimated generation horsepower and the allowable generation horsepower is larger than a difference abnormality determination threshold value while it is determined that the abnormality detection is permitted, with a difference abnormality determination time threshold value, and determines that the difference is abnormal when the difference abnormality detection time is greater than the difference abnormality determination time threshold value.

* * * * *